United States Patent
Williams et al.

(10) Patent No.: US 7,565,332 B2
(45) Date of Patent: Jul. 21, 2009

(54) METHOD AND SYSTEM FOR PROVIDING A WIDGET USABLE IN AFFILIATE MARKETING

(75) Inventors: Carnet Williams, Honolulu, HI (US); Olin Lagon, Honolulu, HI (US); Kevin Hughes, Honolulu, HI (US)

(73) Assignee: ChipIn Inc., Honolulu, HI (US)

( * ) Notice: Subject to any disclaimer, the term of this patent is extended or adjusted under 35 U.S.C. 154(b) by 0 days.

(21) Appl. No.: 11/877,566

(22) Filed: Oct. 23, 2007

(65) Prior Publication Data

US 2008/0097871 A1   Apr. 24, 2008

Related U.S. Application Data

(60) Provisional application No. 60/853,829, filed on Oct. 23, 2006, provisional application No. 60/854,018, filed on Oct. 23, 2006.

(51) Int. Cl.
*G06Q 30/00* (2006.01)
*G06Q 90/00* (2006.01)
*G06F 17/00* (2006.01)

(52) U.S. Cl. .......................... 705/500; 705/14; 705/26; 715/205; 715/206

(58) Field of Classification Search .................. 705/14, 705/26, 500; 715/205, 206, 208
See application file for complete search history.

(56) References Cited

U.S. PATENT DOCUMENTS

| | | | |
|---|---|---|---|
| 6,237,004 B1 | 5/2001 | Dodson et al. | |
| 6,629,135 B1 | 9/2003 | Ross, Jr. et al. | |
| 6,871,327 B2 | 3/2005 | Polk | |
| 7,269,792 B2 | 9/2007 | Consolatti et al. | |
| 2002/0069122 A1 | 6/2002 | Yun et al. | |
| 2002/0174214 A1 | 11/2002 | Carl et al. | |
| 2002/0184539 A1 | 12/2002 | Fukuda et al. | |
| 2003/0196121 A1 | 10/2003 | Raley et al. | |
| 2004/0019807 A1* | 1/2004 | Freund | 713/201 |
| 2004/0024720 A1 | 2/2004 | Fairweather | |
| 2004/0044999 A1* | 3/2004 | Gibson | 717/178 |
| 2004/0083453 A1 | 4/2004 | Knight et al. | |
| 2004/0225617 A1 | 11/2004 | Baser et al. | |
| 2005/0159974 A1* | 7/2005 | Moss et al. | 705/1 |
| 2006/0184802 A1* | 8/2006 | Ibrahim et al. | 713/189 |
| 2007/0112714 A1 | 5/2007 | Fairweather | |
| 2008/0034309 A1 | 2/2008 | Louch et al. | |
| 2008/0255962 A1* | 10/2008 | Chang et al. | 705/27 |
| 2009/0037257 A1* | 2/2009 | Stuckey et al. | 705/10 |

OTHER PUBLICATIONS

DeVoney, C., "Multimedia ToolBook 1.5," Windows Sources, vol. 1, No. 5, p. 386, Jun. 1993.*

(Continued)

*Primary Examiner*—Nicholas D Rosen
(74) *Attorney, Agent, or Firm*—Virtual Law Partners LLP

(57) ABSTRACT

A system and computer implemented method for providing a widget are described. The method and system include rendering the widget on a site. The widget dynamically displays multimedia content associated with a campaign. The widget is also embeddable, copyable, and allows for at least one user action. The method and system also include receiving at least one input related to the at least one action and updating the widget based on a goal corresponding to the at least one action.

17 Claims, 5 Drawing Sheets

OTHER PUBLICATIONS

Frakes, D., "Hot Widgets," Macworld, vol. 23, No. 2, p. 54, Feb. 2006.*

Anon., "Startup PostApp Readies Online Widget Marketplace; PostApp's Widgetbox Would Help Developers Distribute and Handle Payments for Their Web 2.0 Applications," InternetWeek, Jun. 23, 2006.*

Anon., "KickApps Instantly Adds User-Generated Video and Social Networking to Any Website Does Your Website KickApps?" PR Newswire, Jul. 12, 2006.*

Anon., "Sharpcast Delivers a Breakthrough One-Step Solution for Sharing, Backing up, Accessing, and Syncing Photos Between PCs, the Web, and Mobile Phones," PR Newswire, Mar. 7, 2007.*

PCT International Search Report and Written Opinion of the International Searching Authority, issued Jun. 10, 2008, application No. PCT/US07/82283.

PCT International Search Report and Written Opinion of the International Searching Authority, issued Jun. 10, 2008, application No. PCT/US07/82293.

PCT International Search Report and Written Opinion of the International Searching Authority, issued Aug. 8, 2008, application No. PCT/US07/82303.

* cited by examiner

METHOD AND SYSTEM FOR PROVIDING A WIDGET USABLE IN AFFILIATE MARKETING

CROSS-REFERENCE TO RELATED APPLICATIONS

The present application claims priority from co-pending provisional application Ser. No. 60/853,829, filed Oct. 23, 2006, entitled "Method and System for Facilitating Social Payment or Commercial Transactions", and from co-pending provisional application Ser. No. 60/854,018, filed Oct. 23, 2006, entitled "Method and System for Facilitating Social Payment or Commercial Transactions", both assigned to the assignee of the present application.

BACKGROUND OF THE INVENTION

The World Wide Web has matured into an integral part of daily life for users around the world. The Internet may be used for commerce, social transactions, and sharing of multimedia content. For example, electronic commerce has grown significantly in recent years. Consumer commercial transactions that occur over the World Wide Web or use protocols that leverage the Internet such as SMTP (email) are collectively known as "electronic commerce." The current model for electronic commercial transactions typically involves one merchant and one consumer engaging in a one-to-one transaction in which a consumer selects a set of goods and/or services and pays for those goods and/or services through the merchant, and the merchant fulfils the order. The Internet may also be used to facilitate merchants' ability to target potential consumers for commercial transactions. A merchant may customize advertisements and provide the advertisements to selected users. In Google™ AdWords, for example, the merchants' customized content may be selectively displayed based upon search terms users provide to Google™. The content provided also provides a mechanism for users to access the merchants' site and, therefore, make purchases. Similarly, affiliate marketing allows a promoter to serve up a static text/image link to a visitor that allows for a click through to a page set by an Organizer. If the visitor takes action as set by the Organizer (visits a page, completes a form, conducts a transaction, etc.) an Affiliate Marketing firm tracks this action that takes place on the Organizer's server and completes a transaction based on the agreement between the Organizer and Promoter. After an action is taken by a Visitor, the Promoter's text/image link is in no way modified to reflect this incremental action or changes in form, function, and content based on this incremental action. Such commercial mechanisms may be considered to be one-to-many, allowing a single merchant to reach a large number of consumers.

The World Wide Web has also experienced tremendous growth as a social media. As a social media, the World Wide Web provides a vehicle for sharing user generated content, such as through blogs, personal profiles, videos, podcasts, and the like. Platforms for sharing user generated content, such as Blogger, Myspace, YouTube, and Facebook have been developed and benefited from this growth. Other mechanisms for facilitating social interactions, such as eVite, have also grown. Using eVite, for example, an organizer may set up an event, sent invitation emails to potential participants, manage RSVPs, estimate budgets, and perform other functions related to the event via dedicated pages on eVite. Moreover, social media and fundraising combine in social payments to raise money for a variety of causes. Social media may be used to provide "Blogathons" that raise money for charities, political campaigns, allow musicians to appeal directly to their audience to underwrite albums, raise money for schools, parties, clubs and sports teams, or other causes. In such social payment transactions, organizers may solicit funds from other individuals visiting blogs or sites.

In order to display media for a variety of purposes, conventional widgets may be used. The conventional widgets are often used to display content from a widget owner to a user. For example, a user may load a page, or site, containing the conventional widget and view content, such as video, provided by the conventional widget. Conventional widgets are generally embeddable, portable applications that often run without access to a user's file system. The conventional widget may be copyable by users. Thus, a user may copy a widget from a site to a location of the user's choosing, for example the user's own blog. Conventional widgets are also generally small in size and less complex than typical applications, such as email or word processing applications. However, there is typically no agreed upon limitation in size or complexity for conventional widgets. Such widgets may be used, for example, by bloggers to share Although electronic commerce and social transactions are possible via the World Wide Web, there are drawbacks. Many social and electronic commerce transactions involve many-to-many relationships. Such relationships are not well supported by current electronic commerce and social media platforms. In addition, the ability of tools, such as widgets, to reflect individual users' tastes may be limited. Consequently, users' ability to engage in social, commercial, and other transactions including sharing of multimedia content may be limited.

Accordingly, what is needed is a method and system for facilitating social and commercial transactions via the Internet. The present invention addresses such a need.

BRIEF SUMMARY OF THE INVENTION

A system and computer implemented method for providing a widget are described. The method and system include rendering the widget on a site. The widget dynamically displays multimedia content associated with a campaign. The widget is also embeddable, copyable, and allows for at least one user action. The method and system also include receiving at least one input related to the at least one action and dynamically updating the widget based on a goal corresponding to the at least one action. In another aspect, the method and system include rendering the widget on a site associated with the widget owner. In this aspect, the campaign is for an organizer. In this aspect, the method and system also include providing a payment to the widget owner based on the goal being fulfilled. In another aspect, the method and system include providing a widget maker, a database, and at least one server. In this aspect, the widget maker receives a configuration of the widget. The configuration includes the campaign with which the widget is associated and indicates the update for the widget based on the goal corresponding to the at least one action. The database is for storing the widget. The server renders the widget on a site. In another aspect, the method and system include providing embeddable code based on a configuration. The embeddable code is copyable, allows at least one user action, is associated with a campaign, and dynamically displays multimedia content. The configuration further indicates an update for the widget based on the goal for the at least one action.

According to the method and system disclosed herein, widget(s) may be used for transactions, such as affiliate marketing.

DETAILED DESCRIPTION OF THE INVENTION

Figure 1:
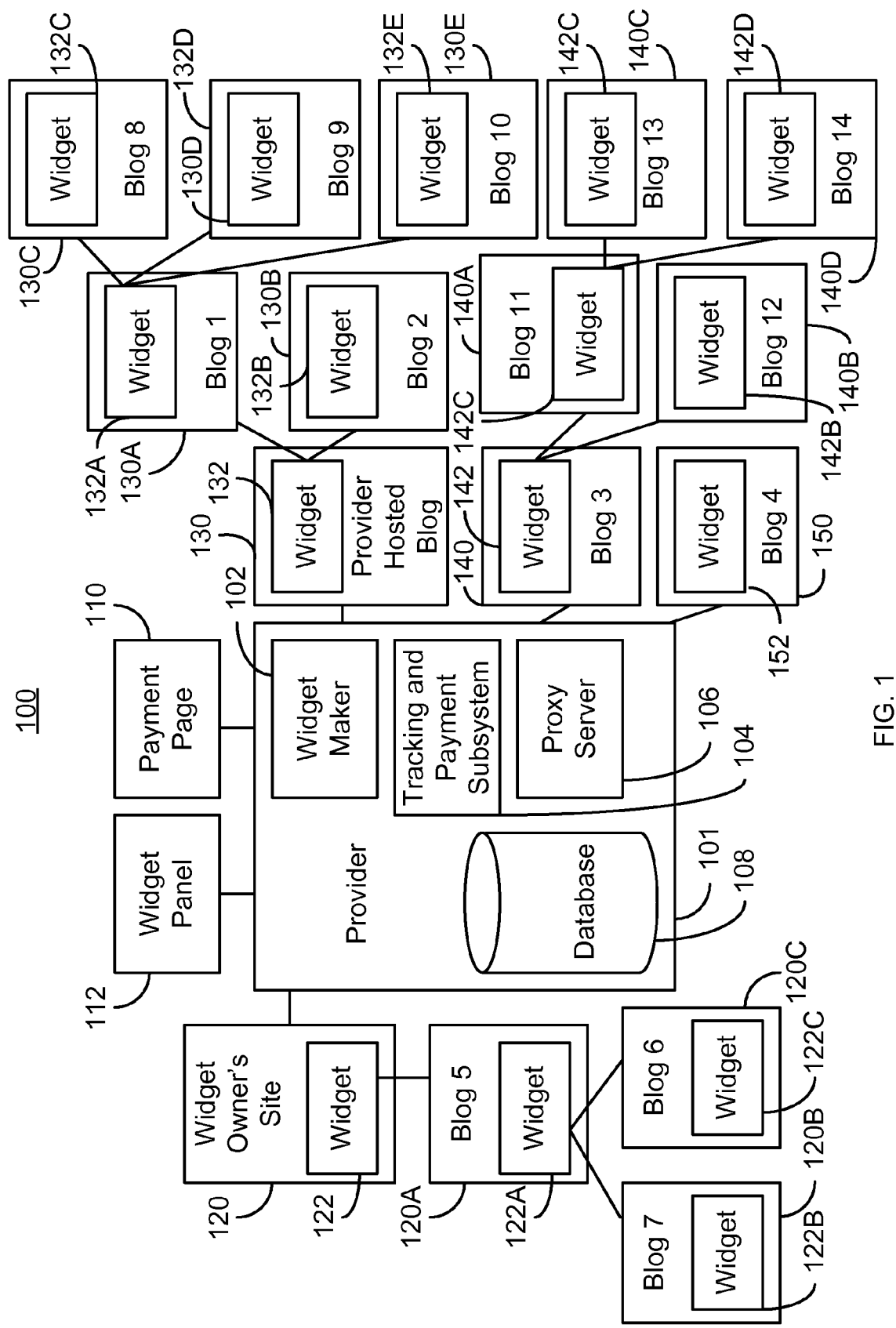
FIG. 1 depicts an exemplary embodiment of a system for performing transactions over the Internet utilizing widgets.

The present invention relates to a method and system for providing a widget. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A system and computer implemented method for providing a widget are described. The method and system include rendering the widget on a site. The widget dynamically displays multimedia content associated with a campaign. The widget is also embeddable, copyable, and allows for at least one user action. The method and system also include receiving at least one input related to the at least one action and dynamically updating the widget based on a goal corresponding to the at least one action. In another aspect, the method and system include rendering the widget on a site associated with the widget owner. In this aspect, the campaign is for an organizer. In this aspect, the method and system also include providing a payment to the widget owner based on the goal being fulfilled. In another aspect, the method and system include providing a widget maker, a database, and at least one server. In this aspect, the widget maker receives a configuration of the widget. The configuration includes the campaign with which the widget is associated and indicates the update for the widget based on the goal corresponding to the at least one action. The database is for storing the widget. The server renders the widget on a site. In another aspect, the method and system include providing embeddable code based on a configuration. The embeddable code is copyable, allows at least one user action, is associated with a campaign, and dynamically displays multimedia content. The configuration further indicates an update for the widget based on the goal for the at least one action.

The method and system are mainly described in terms of particular systems provided in particular implementations. However, one of ordinary skill in the art will readily recognize that this method and system will operate effectively in other implementations. For example, the systems, devices, and networks usable with the present invention can take a number of different forms. For example, the method and system may not be limited to the Internet, but instead may be usable with other networks and/or devices, such as cellular telephones and other hand-held devices. The method and system are also described in the context of particular transactions being performed. One of ordinary skill in the art will recognize, however, that the method and system may be used in other transactions. The method and system will also be described in the context of particular methods having certain steps. However, the method and system operate effectively for other methods having different and/or additional steps not inconsistent with the present invention.

FIG. 1 depicts an exemplary embodiment of a system 100 for electronically performing transactions utilizing widgets. The system 100 may be used for various transactions such as electronic commerce, social payment transactions (e.g. fundraising), affiliate marketing, other social transaction such as sharing of multimedia, blogging, or other activities. The transactions may be performed through a variety of electronic media, for example via the Internet, through a cell network, using mobile phones, desktop computer systems, PDAs, laptop computer systems, or other electronic systems. Such transactions relate to events. For example, an organizer such as a particular cause or charity may desire to use the system 100 for events such as a fundraising campaign based only on Internet contributions, blograising performed in conjunction with a traditional (non-Internet based) fundraising campaign, campaigns that drive and track traffic to a particular Web site, campaigns that drive and track visitor actions, campaigns based on the occurrence of a particular event such as an ongoing fundraising campaign, in a campaign of limited duration, or for other purposes. Similarly, a couple getting married may use the system 100 to share information about the wedding and/or multimedia from the wedding itself, track guests, or otherwise communicate with interested individuals. In affiliate marketing, a business or other entity termed an organizer may use the system 100 serving up dynamic content to users, or viewers, of sites in the system 100. In order to facilitate such electronic transactions, the system 100 allows a widget owner to configure a widget, allows the widget to be disseminated, and may manage payments, rich media, and/or other data transmitted through the widget.

In the embodiment shown, the system 100 includes a provider 101. The provider 101 allows a widget owner to configure a widget, may host a widget, may enforce rules relating to the widget, may store data related to the widget owner, and perform other tasks related to the widget. The widget owner might be the organizer of the event or campaign and/or a content provider owning one of the widgets in the system 100. Coupled directly to the provider 101 are a site, or blog, 120 corresponding to a widget owner, a provider hosted blog 130, additional blogs 140 and 150. The widgets 122, 132, 142, and 152 are provided on blogs 120, 130, 140 and 150, respectively. In addition, blogs 120A, 120B, 120C, 130A, 130B, 130C, 130D, 130E, 140A, 140B, 140C, and 140D are shown as indirectly coupled with the provider 101. The blogs 120A, 120B, 120C, 130A, 130B, 130C, 130D, 130E, 140A, 140B, 140C, and 140D include corresponding widgets 122A, 122B, 122C, 132A, 132B, 132C, 132D, 132E, 142A, 142B, 142C, and 142D, respectively. The coupling with the provider 101 of the sites 120, 130, 140, 150, 120A, 120B, 120C, 130A, 130B, 130C, 130D, 130E, 140A, 140B, 140C, and 140D indicates that the widgets 122A, 122B, 122C, 132A, 132B, 132C, 132D, 132E, 142A, 142B, 142C, and 142D, respectively, are copies rather than physical connections. For example, the widget 122A is a copy of the widget 122. Thus, blogs 120A, 120B, 120C, 130A, 130B, 130C, 130D, 130E, 140A, 140B, 140C, and 140D may receive content from and provide content to the provider 101 directly. In addition, for simplicity a single widget 122A, 122B, 122C, 132A, 132B, 132C, 132D, 132E, 142A, 142B, 142C, and 142D is associated with each blog 120, 130, 140, 150, 120A, 120B, 120C, 130A, 130B, 130C, 130D, 130E, 140A, 140B, 140C, and 140D, respectively. However, in another embodiment, multiple widgets (not shown) may reside on a single site.

The provider 101 includes a widget maker 102 that may have a corresponding widget panel 112, tracking and/or payment subsystem 104, proxy server 106, and a database 108. The provider 101 might also provide a corresponding payment page 110, for example if transactions involving payment are provided through the provider 101. Thus, the widget maker 102, tracking and/or payment subsystem 104, widget panel 112, and database 108 may be controlled by and accessed through the provider 101. The owner of the provider 101 may, for example, charge a fixed fee or a percentage of donations for use of and services provided in connection with the system 100. Although shown together at the provider 101, the components 102, 104, 106, 108, 110, and 112 may be remotely located and/or owned in whole or in part by another entity. In another embodiment, at least some of the components 102, 104, 106, 108, 110, and 112 might be omitted. Use of such components also depends upon the transactions for which the system 100 is utilized. For example, if the system 100 is utilized for sharing of content not involving financial transactions and payment, the payment page 110 and payment portion of the subsystem 104 might be omitted. In addition, although only one of each component 102, 104, 106, 108, 110, and 112 are shown, multiple versions may be provided. In an alternate embodiment, the tasks of the components 102, 104, 106, 108, 110, and 112 may also be divided in another manner.

The widget maker 102, as well as the widget panel 112 may be used to configure widgets 122, 132, 142, 152, 122A, 122B, 122C, 132A, 132B, 132C, 132D, 132E, 142A, 142B, 142C, and 142D. For simplicity, the widget maker 102 is described in the context of the widgets 122, 132, 142, and/or 152. In operation, the widget owner utilizes the widget maker 102 in order to generate and customize the widget 122, 132, 142 and/or 152. In one embodiment, the widget maker 102 provides the widget panel 112, which is a user interface that allows the widget owner to provide input to the provider 101 to customize the widget 122, 132, 142 and/or 152. In one embodiment, the widget panel 112 is a page that allows the widget owner to select features of the widget 122, 132, 142, and/or 152. For example, the color, shape, event(s)/campaign(s) or other externalities associated with the widget 122, 132, 142, and/or 152, rich media, level of detail and other aspects of the widget 122, 132, 142, and/or 152 may be set based on the widget owner's elections in the widget panel 112. For example, the widget owner may specify that the widget 122, 132, 142, and/or 152 is to be associated with specific event(s), data sources, and/or content and may provide a profile for the type of events and/or content with which the widget 122, 132, 142, and/or 152 may be associated. The widget owner may also specify the location of fields, data within the fields, colors, and other features of the widget 122, 132, 142, and/or 152 through the widget maker 102. Thus, a single widget 122, 132, 142, and/or 152 may be configured to display information related to multiple events, ad campaigns, or other items in which the widget owner is interested.

The tracking and payment subsystem 104 may be used to track various attributes of the widgets and, in some embodiments, to make payments through the widget. For example, click throughs, number of times viewed, copies, or other ongoing attributes related to the widget may be tracked using the tracking and payment subsystem. In addition, the tracking and payment subsystem 104 may be utilized in managing the payments made and the payment page 110. The payment page 110 may be used to perform financial transactions, such as making payments and/or contributions associated with the widgets. The tracking and payment subsystem 104 may authenticate users and/or forms of payment, track payments, validate extraction of funds, validate and track payments and forms of payment made to content providers, and otherwise manage the actual funds provided to an event or paid out from an event. In one embodiment, the payments may be validated and held by the owner of the provider 101 or other designated third party (not shown) until a particular condition is fulfilled, for example the end of the fundraising campaign, sale, or other event. In such an embodiment, a widget owner may be allowed to extract some or all of the funds. In an alternate embodiment, payments may not be considered made and extraction of funds may not be allowed until the event closes. Further, the tracking and payment subsystem 104 may allow payments to content providers (e.g. widget owners of copies), widget owners of ancestor widgets, and/or other designated entities in a variety of forms including but not limited to cash or the equivalent, gift cards, or other items. The payment features provided through the tracking and payments subsystem 104 may include allowed forms of payment, event tracking, rules for extracting funds, the look and feel of the payment page, and other data relating to payment. Although described as a single subsystem 106, the tracking and payment functions may be split into multiple subsystems.

The proxy server 106 may be used to replicate the widget(s) to other sites not associated with the widget owner or provider 101. For example, the proxy server 106 may be used to provide the widget 142D in the blog 140D. Furthermore, in one embodiment, the proxy server 106 may allow content, such as rich media audio or video, from site(s) not directly associated with the provider 101 to be played on the widgets. In one embodiment, widgets may communicate directly through the proxy server 101, for example to disseminate comments, donation amounts, and/or other information. Individual components of the provider 101 are discussed further below.

The database 108 may store data relating to the widget owner and the widgets hosted by the provider 101. For clarity the database 108 is described in the context of the widget 122. Thus, the database 108 may store the parameters and other data corresponding to the widget owner's selections for the widget 122, the identities of each widget and widget owner, as well as other data related to the widget owner. Thus, the widget data may be considered to include owner selected widget features, payment features (if any), and event features (if any). For example, widget features may include the content such as rich media displayed on the widget, thermometers or other mechanisms selected for tracking the progress of the campaign, colors, specific content providers authorized to host the widget, profiles of content providers authorized to host the widget, parameters related to dynamically updating the widget, and other data used in customizing the widget. The widget owner may also specify parameters corresponding to the ability of copies of the widget 122 to be customized. These parameters may also be stored in the database 108. Also stored in the database 108 may be relationships between widgets. For example, the database 108 may store the identity of the widgets 122, 122A, 122B, and 122C as well as an indication that 122A is a copy of 122, and that 122B and 122C are copies of 122A.

Although not separately shown, the provider 101 may include other components. For example, the provider 101 may include server(s) for rendering, authenticating, and performing other functions related to the widgets 122, 132, 142, 152, 122A, 122B, 122C, 132A, 132B, 132C, 132D, 132E, 142A, 142B, 142C, and 142D.

As discussed above, the sites 120, 130, 140, 150, 120A, 120B, 120C, 130A, 130B, 130C, 130D, 130E, 140A, 140B, 140C, and 140D contain corresponding widgets 122, 132, 142, 152, 122A, 122B, 122C, 132A, 132B, 132C, 132D, 132E, 142A, 142B, 142C, and 142D, respectively. The widgets 122, 132, 142, 152, 122A, 122B, 122C, 132A, 132B, 132C, 132D, 132E, 142A, 142B, 142C, and 142D dynamically display multimedia content. In one embodiment, the widgets 122, 132, 142, 152, 122A, 122B, 122C, 132A, 132B, 132C, 132D, 132E, 142A, 142B, 142C, and 142D are analogous to conventional widgets in that the widgets 122, 132, 142, 152, 122A, 122B, 122C, 132A, 132B, 132C, 132D, 132E, 142A, 142B, 142C, and 142D are used to display multimedia content, may be embeddable and portable, may be copyable, may be small in size, and may be less complex than typical applications. In one embodiment, the widgets 122, 132, 142, 152, 122A, 122B, 122C, 132A, 132B, 132C, 132D, 132E, 142A, 142B, 142C, and 142D may thus be embeddable code snippets, for example Flash, HTML, XML, XHTML, SBML, .NET, Java, JavaScript, JSP, VisualBasic Applet or analogous applications. The widgets 122, 132, 142, 152, 122A, 122B, 122C, 132A, 132B, 132C, 132D, 132E, 142A, 142B, 142C, and 142D may be embeddable in a multitude of architectures, for example web pages, mobile phones, PDAs, and/or provided via email. In addition, because the widgets 122, 132, 142, 152, 122A, 122B, 122C, 132A, 132B, 132C, 132D, 132E, 142A, 142B, 142C, and 142D are embeddable, they may be self-replicating in nature. The widgets 122, 132, 142, 152, 122A, 122B, 122C, 132A, 132B, 132C, 132D, 132E, 142A, 142B, 142C, and 142D may also be viewed as the content appearing on the corresponding site 120, 130, 140, 150, 120A, 120B, 120C, 130A, 1320, 130C, 130D, 130E, 140A, 140B, 140C, and 140D, respectively, when the widget 122, 132, 142, 152, 122B, 122C, 132A, 132B, 132C, 132D, 132E, 142A, 142B, 142C, and 142D is rendered. In addition, although described herein as being rendered on a site that may be accessed through a browser (not explicitly shown), the widgets 122, 132, 142, 152, 122A, 122B, 122C, 132A, 132B, 132C, 132D, 132E, 142A, 142B, 142C, and 142D may not be limited to such environments. For example, the widgets 122, 132, 142, 152, 122A, 122B, 122C, 132A, 132B, 132C, 132D, 132E, 142A, 142B, 142C, and/or 142D may reside on a desktop, mobile phone, or other environment.

In one embodiment of the system 100, the widgets 122, 142, and 152 may be original widgets initially configured by their owners, rather than copies of another widget. For example, the widget owner's site 120 includes a widget 122 that is provided by the provider 101. Similarly, the sites 140 and 150 include the widgets 142 and 152, respectively, provided by the provider 101. In the embodiment shown, the widgets 122, 142, and 152 are configured by the widget owner(s) through the widget maker 102. Configuration of the widgets 122, 142, and 152, particularly as it relates to copies of the widgets 122, 142, and 152 is discussed below. In another embodiment, the widgets 122, 142, and 152 may be copies of another widget. For example, the widgets 142 and 152 might be copies of the widget 122.

The provider hosted site, or blog, 130 is shown as including a widget 132. For the purposes of describing the system 100, the widget 132 is related to the widget 122. In another embodiment, the provider hosted site 130 may include other widgets, for example corresponding to the widgets 142 and 152. As a result, every widget and/or it corresponding event might have its own URL. This unique address may be tied to a widget owner or individual and may symbolize a particular event or campaign. In one embodiment, the widget 132 and the widget 122 are substantially identical. In another embodiment, aspects of the widget 132 may be different from the widget 122. For example, the colors used or placement of fields may differ. These differences may be based upon the widget owner's preference as established during initial configuration of the widgets 122 and 132, or at some later modification of the widgets 122 and 132. In one embodiment, the widget owner configures both the widgets 122 and/or 132. In one embodiment, the widget owner may choose to have only the widget 122, only the widget 132, or both the widget 122 and/or 132 rendered on the sites 120 and 130.

In one embodiment, the widgets 122, 132, 142, and 152 are made using the widget maker 102. As discussed above, the widget owner may access the widget maker 102 through the widget panel 112. The widget maker 102 offers the widget owner the opportunity to provide parameters used in customizing the widgets 122, 132, 142, and/or 152. For example, the color, multimedia to be provided, tracking mechanisms allowed, ability of the widgets 122, 132, 142, and/or 152 to be copied, modifiability of the copies, inclusion of fields, location of fields, and other features of the widgets 122, 132, 142, and/or 152 may be specified through the widget maker 102. These parameters may be stored by the provider 101, for example in the database 108. In one embodiment, the widgets 122A, 122B, 122C, 132A, 132B, 132C, 132D, 132E, 142A, 142B, 142C, and 142D may be customized, at least to a limited extent, in a similar fashion. In addition, customization of a particular copy may be limited or otherwise controlled by customization of widget(s) from which the copy is derived. Such customization may take place through the widget maker 102 and/or through a widget editor (not separately shown in FIG. 1), which may allow for customization of copied widgets but not generation of new widgets. The widget editor may be considered to be part of the widget maker 102 or may be a separate component.

Although the original code from the widget maker 102 may reside with the provider 101, the widgets might be copied to other site(s). For clarity, such copying is discussed primarily in the context of widget 122. In one embodiment, the widget 122 may be copied through a field within the widget 122. In another embodiment, the widget 122 may be copied via the proxy server 106. In yet another embodiment, the widget 122 may be copied either through a field within the widget 122 or via the proxy server 106. Alternatively, a separate mechanism for copying the widget 122 might be provided. For example, the blog 120A includes a widget 122A that is a copy of the widget 122. Similarly, the blogs 120B and 120C include widgets 122B and 122C, respectively, that are copies of the widget 122A (and thus the widget 122). The blogs 130A and 130B include widgets 132A and 132B, respectively, that are copies of the widget 132. Blots 130C, 130D, and 130E include widgets 132C, 132D, and 132E, respectively, that are copies of the widget 132A and thus the widget 132. The blogs 140A and 140B include widgets 142A and 142B, respectively, that are copies of the widget 142. In addition, in one embodiment, copies can be made of previously copied widgets. For example, the blogs 140C and 140D include widgets 142C and 142D, respectively, that are copies of the widget 142A (and thus the widget 142). In one embodiment, the widget 142 might be a copy of the widgets 122 and/or 132. Alternatively, the widget 142 may be a distinct widget hosted by the provider 101. Thus, the widgets 122A, 122B, 122C, 132A, 132B, 132C, 132D, 132E, 142A, 142B, 142C, and 142D are copies of the widgets 122, 132, and 142. Stated differently, the widgets 122, 132, and 142 are ancestors of the widgets 122A, 122B, 122C, 132A, 132B, 132C, 132D, 132E, 142A, 142B, 142C, and 142D. As used herein, an ancestor widget is a widget from which another widget is copied. The widget, or copy, may but need not be updated based upon changes to the ancestor widget. For example, changes to an ancestor widget may, but need not, be pushed in real time to copies. In addition, multiple generations of ancestor widgets may be formed. For example, both the widgets 122 and 122A are ancestors of the widgets 122B and 122C. The widgets 122B and 122C are thus second generation copies of the widget 122 and first generation copies of the widget 122A.

Although described as copies, the widgets 122A, 122B, 122C, 132A, 132B, 132C, 132D, 132E, 142A, 142B, 142C, and 142D may not be identical to the widgets 122, 132, and 142. Instead, the widgets 122A, 122B, 122C, 132A, 132B, 132C, 132D, 132E, 142A, 142B, 142C, and 142D may be customized, at least to a limited extent, by the owners of the widgets 122A, 122B, 122C, 132A, 132B, 132C, 132D, 132E, 142A, 142B, 142C, and 142D. In particular, a widget owner may set the parameters of the widget 122, 132, and/or 142 to control the customization of copies 122A, 122B, and 122C, copies 132A, 132B, 132C, 132D, and 132E, and copies 142A, 142B, 142C, and 142D, respectively. Such customization is described below.

The provider 101 may be able to push data to one or more of the widgets 122, 132, 142, and 152, as well as to the widgets 122A, 122B, 122C, 132A, 132B, 132C, 132D, 132E, 142A, 142B, 142C, and 142D. Thus, data may be pushed to all of the widgets 122, 132, 142, 152, 122A, 122B, 122C, 132A, 132B, 132C, 132D, 132E, 142A, 142B, 142C, and 142D or a selected portion of the widgets 122, 132, 142, 152, 122A, 122B, 122C, 132A, 132B, 132C, 132D, 132E, 142A, 142B, 142C, and 142D. In order to determine to which widgets 122, 132, 142, 152, 122A, 122B, 122C, 132A, 132B, 132C, 132D, 132E, 142A, 142B, 142C, and 142D data is to be pushed, the relationships between widgets may be tracked and stored, for example in the database 108. For example, suppose data related to changes to the widget 122 is to be pushed only to first-generation copies. In such an embodiment, the relationship between the widgets 122 and 122A as well as the relationships between the widget 122 and the widgets 122B and 122C is utilized to determine that data should only be pushed to the widget 122A. Consequently, the relationships between, or ancestry of, the widgets 122, 132, 142, 152, 122A, 122B, 122C, 132A, 132B, 132C, 132D, 132E, 142A, 142B, 142C, and 142D may be tracked and/or stored by the provider 101. The ability to push data to widgets and/or their copies may be determined by the widget owners.

Further, a widget 122, 132, 142, 152, 122A, 122B, 122C, 132A, 132B, 132C, 132D, 132E, 142A, 142B, 142C, and/or 142D may be pushed to selected content providers (otherwise known as promoters) based upon the widget owner's preferences and characteristics of the content providers. These content providers may be considered to be widget owners for the copies of the widget on their site. For example, suppose the widget owner of widget 142 wishes to obtain contributions for a political campaign. The widget owner may indicate that certain sites having compatible political views, that are known to reach a particular audience, that relate to a particular geographic area, and/or that have a requisite level of effectiveness in obtaining contributions are desired. Such sites may be blogs 140A, 140B and 140C. Further, the content providers of the blogs 140A, 140B, and 140C may agree to host widgets for particular causes. If there is a match between the preferences of the widget owner and the content providers of the blogs 140A, 140B and 140C, the provider 101 may push the widget 142 for the political campaign to blogs 140A, 140B and 140C. Thus, the widgets 142A, 142B, and 142C may be provided. In return, the content providers (e.g. owners of the sites 140A, 140B, and 140C) may receive payment for hosting copies of the widget 142. In order to determine to which widgets 122, 132, 142, 152, 122A, 122B, 122C, 132A, 132B, 132C, 132D, 132E, 142A, 142B, 142C, and 142D were pushed to which sites, the relationships between widgets may be tracked and stored. For example, the widget 122 may be desired to be pushed to the site 120A, thereby providing widget 122A. Consequently, the relationship between the widget 122A pushed to the site 120A and the widget 122 may be stored in the database 108.

Thus, a widget 122, 132, 142, 152 and any copies may have both many-to-one and one-to-many capabilities. Stated differently, a single widget may be associated with multiple events, widget owners, or campaigns. In addition, a single fundraising event/campaign or events for a single organizer may be displayed on multiple widgets.

Data may also be encrypted by the data source provider and decrypted by the widget 122, 132, 142, 152, 122A, 122B, 122C, 132A, 132B, 132C, 132D, 132E, 142A, 142B, 142C, and/or 142D based on private/public key cryptography, encryption, DES variants, passwords, or other secure means. Each widget 122, 132, 142, 152, 122A, 122B, 122C, 132A, 132B, 132C, 132D, 132E, 142A, 142B, 142C, and 142D may also have identifiers, for example in a header. These identifiers may, for example, associate a widget with particular widget owner(s), particular widgets 122, 132, 142, 152, 122A, 122B, 122C, 132A, 132B, 132C, 132D, 132E, 142A, 142B, 142C, and 142D, particular event(s), and/or particular content provider(s). Thus, the identifiers may indicate from which ancestor widget a particular widget 122A, 122B, 122C, 132A, 132B, 132C, 132D, 132E, 142A, 142B, 142C, and 142D was replicated. The identifier may include multiple generations of ancestors and/or indicate where in the family tree of copies the widget fits. Thus, the ancestor relationships, such as parent-child relationships between widgets, as well as the degrees of separation between the generations of copies and their ancestor(s) may be tracked. The identifiers may, therefore, control of widgets 122, 132, 142, 122A, 122B, 122C, 132A, 132B, 132C, 132D, 132E, 142A, 142B, 142C, and 142D based upon their relationships to other widgets in the family tree. The identifiers may also allow the widget 122, 132, 142, 122A, 122B, 122C, 132A, 132B, 132C, 132D, 132E, 142A, 142B, 142C, and 142D to be validated and controlled, for example by the provider 101 and/or widget owner. When a user accesses a site, such as the site 120A, the provider 101 may render the widget 122A based upon the configuration selected by the owner of the ancestor widget 122 and the owner of the widget 122A, render the widget 122A based on preferences of the content provider, accept content from the widget 122A, allow and track payments via the widget 122A, push content to the widget 122A, and perform other tasks using the widget 122A, as described below. Analogous controls may also be exercised over copies of the ancestor widget.

Figure 2:
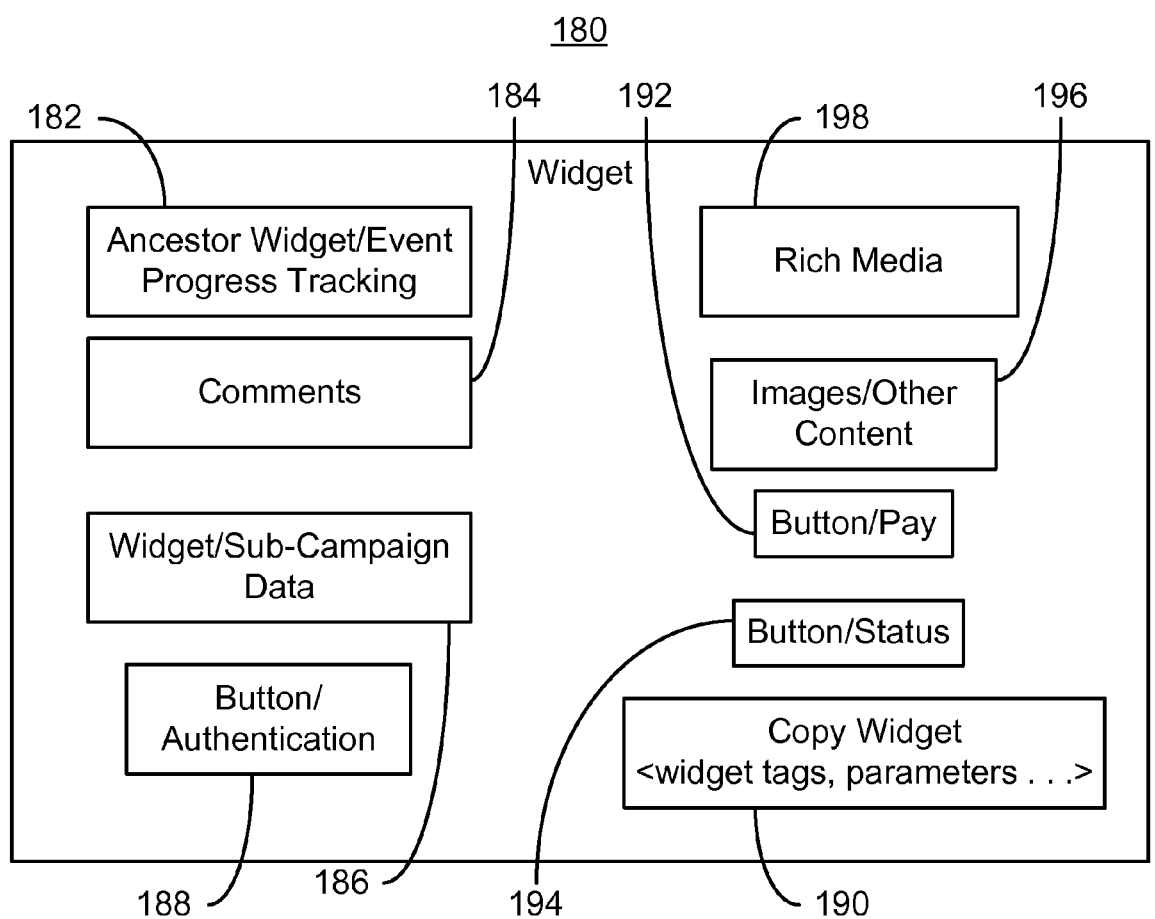
FIG. 2 depicts an exemplary embodiment of a widget for dynamically displaying multimedia content.

FIG. 2 depicts an exemplary embodiment of a widget 180 that may dynamically display multimedia content. The widget 180 may thus correspond to one or more of the widgets 122, 132, 142, 152, 122A, 122B, 122C, 132A, 132B, 132C, 132D, 132E, 142A, 142B, 142C, and 142D depicted in FIG. 1. Thus, the designations 180 and 122, 132, 142, 152, 122A, 122B, 122C, 132A, 132B, 132C, 132D, 132E, 142A, 142B, 142C, and/or 142D may be used interchangeably herein. Referring to FIGS. 1 and 2, the widget 180 includes fields 182, 184, 186, 188, 190, 192, 194, 196, and 198. The widget 180 may also include other information (not shown in FIG. 2) such as the header described above. The widgets 122, 132, 142, 152, 122A, 122B, 122C, 132A, 132B, 132C, 132D, 132E, 142A, 142B, 142C, and 142D may include some or all of these fields 182, 184, 186, 188, 190, 192, 194, 196, and 198 as well as other fields (not shown). Moreover, although only one of each field 182, 184, 186, 188, 190, 192, 194, 196, and 198 are shown, multiple versions of one or more of the fields 182, 184, 186, 188, 190, 192, 194, 196, and 198 might be included. For example, multiple rich media fields 198, multiple images/content fields 196 and multiple fields 182 for tracking an event associated with a widget may be included. In addition to the fields 182, 184, 186, 188, 190, 192, 194, 196, and 198, the color and other aspects of the widget 180 may be customized. Configuration of the fields 182, 184, 186, 188, 190, 192 194, 196, and 198 may thus be part of customization of the widget 180. For example, the inclusion of, size, and placement of the fields 182, 184, 186, 188, 190, 192, 194, 196, and 198 may differ between the widgets 122, 132, 142, 152, 122A, 122B, 122C, 132A, 132B, 132C, 132D, 132E, 142A, 142B, 142C, and 142D.

The field 182 may be used in tracking attributes related to the widget 180 or widget(s) from which the widget 180 was copied. For example, an event associated with the widget 180, such as a fundraising campaign, may be tracked in the field 182. The tracking mechanisms, such as a thermometer, status bar, and/or count down clock, may provide real time views of the event in the field 182. Other features that may be tracked and depicted, for example in the field 182 may include data such as a fundraising or other goal, event start time and duration, and the type of output for each event. Upon a refresh request and/or periodically based upon a widget owner and/or provider set preferences, the event progress tracking mechanisms in the field 182 may be updated by the provider to reflect any changes in the event. For example, upon donation from any of the widgets 122, 132, 142, 152, 122A, 122B, 122C, 132A, 132B, 132C, 132D, 132E, 142A, 142B, 142C, and 142D depicted in FIG. 1, the provider 101 may push data to all (or some subset of) the widgets 122, 132, 142, 152, 122A, 122B, 122C, 132A, 132B, 132C, 132D, 132E, 142A, 142B, 142C, and 142D to reflect the change in the amount received. Thus, the level of a thermometer or status bar in the field 182 may change based upon real-time events. The tracking mechanisms can be provided for the campaign(s) associated with the event or provider, sub-campaigns, as well as other externalities that are of interest to the widget owner. For example, the owner of the widget 122A may initiate a sub-campaign for a fundraising campaign associated with the widget 122. The widgets 122B and 122C may then be associated with the sub-campaign, as well as the campaign. Consequently, the viewers of the widgets 122B and 122C might make donations using the widgets 122B and 122C, respectively.

Field 186 may be similar to field 182. Tracking of sub-campaigns or other attributes related to widgets that are copies of an ancestor widget may be provided in field 186. For example, the field 186 may be used to track the progress of a sub-campaign in the context of a larger fundraising campaign tracked in the field 182. For example, status bars, thermometers, or other mechanisms that track attributes of the copy may be provided in field 186. Note that if the widget 180 is a copy of another widget, the tracking provided in field 186 may be for attributes selected by the owner of the widget 180. The field 182 may then display tracking of attributes of an ancestor widget. Conversely, if the widget 180 is an ancestor of another widget, the field 182 may provide tracking for attributes originally selected by the owner of the widget 180. The field 186 may then be provided at a later date if the owner of the widget 180 desires to track attributes of a copy.

Comments may be made and/or displayed in the comments field 184 and/or in the rich media field 198. Comments may be in textual or rich media format including video and audio. The widget 180 may also include rich media customized by the widget owner or other content provider in field 198. For example, a widget owner can choose to include images as well as audio and/or video messages to encourage users to make a donation, perform some other action, or simply share content. Content providers might also be allowed add their own content to the widget on their site and copies thereof. For example, the widget owner for site 130D may be allowed to add their own rich media content to the widget 132D in the field 198. The provider 101 renders such rich media when the site hosting 130D the widget 132D is accessed by a user. In one embodiment, the rich media discussions/comments in fields 184 and 198 may be published in real time throughout all widgets that are related to a particular widget regardless of from where the widget is being hosted. Thus, threaded text and rich media discussions/comments may be provided via the widgets 180 themselves. In addition, comments provided via one of the widgets 122, 132, 142, 152, 122A, 122B, 122C, 132A, 132B, 132C, 132D, 132E, 142A, 142B, 142C, and 142D may be disseminated by the provider 101 to all or a subset of the widgets 122, 132, 142, 152, 122A, 122B, 122C, 132A, 132B, 132C, 132D, 132E, 142A, 142B, 142C, and 142D upon a refresh request and/or periodically based upon organizer and/or provider set preferences.

The buttons 188, 192, and 194 may have various uses. Although only three buttons 188, 192 and 194 are shown, fewer or more buttons may be provided. In one embodiment, the button 194 is a status button. The status button 194 provides a mechanism for viewing further details relating to the event or other externality associated with the widget 180 and/or owner of the widget 180.

The button 192 may be a payment button. The payment button 192 may allow users to make payments through the widget 180 without leaving the site hosting the widget 180. Such a payment might, for example, be for electronic commerce or fundraising. In one embodiment, selection of a payment button 192 by a user results in the corresponding organizer-configured payment page 110 being accessed. The user may then make a payment that is managed by the tracking and payment subsystem 104. The payment features that may correspond to the payment button 192 may include allowed forms of payment, event tracking, rules for extracting funds, the look and feel of the payment page 110, and other data relating to payment. The payment button 192 may also refer the user to another site (not shown) through which payment may be made. Such a site might, but need not, be associated with the provider 101.

In addition, the widget 180 may be authenticated, which facilitates payment through the widget 180. For example, the button 188 may be an authentication button. A user may click on the authentication button 188. The widget 180 may then make a call back to one or more authentication services. The authentication received is passed back to the widget 180. Alternatively, a widget 180 may automatically and/or periodically request authentication and present this to the user in the field 188. This communication with authentication services may be performed via the provider 101 and/or through a third party. The authentication allows a user to have a greater level of assurance that payment through the widget 180 is secure.

Authentication of the widget 180 may be extended to other embeddable applications, such as Flash applications. The authentication process may also use an embedded, dynamically generated by a third party, site seal (not shown) on the widget 180. This embeddable seal may be provided in the form of a code snippet (not shown) by a third party authentication firm to be embedded in the organization's widget. Before a widget owner embeds the code snippet, they complete a validation process with the third party. Once authorized, embedded, and published live on the Internet, the user of the widget 180 sees a dynamically generated seal directly within the widget 180 that may also include dynamically generated code specific to that widget 180 from the third party authentication firm. Such a seal may be provided in the field 188. When a user clicks on the seal, they are taken to the trusted third party's site to authenticate that the widget 180 is registered with the third party and to view any security levels, if present, that protects the user of widget 180. Upon arriving at the third party site for validation, the user may enter a code that is present on the seal. If the code entered matches what the third party expects for that seal, the profile of the company and other attributes are shared with the user. The third party may also use URL information to ensure, if desired, that a widget 180 is being hosted on a Web page or other Internet host medium, if URL information is required as part of the authentication process. This might include an additional check that the source code of the widget 180 remains with the trusted third party and/or has been checked by the third party and that the user is viewing an un-tampered version of a widget 180 based on digital signature credentials embedded in the widget 180 by the third party firm. The seal may also include dynamically generated content directly into the widget 180 that shows information including the current date and time to show visitors authentication information without having the visitor click through that the widget.

The widget 180 may also include a copying field 190. As discussed above, the widget 180 may also be self replicating and may, therefore, be copied and placed in multiple sites by multiple content providers. To facilitate this feature, the copying field 190 may be provided. The copying field 190 may allow copying of the widget 180 through the widget 180. In one embodiment, the copying field 190 provides a link that displays the code for the widget 180 and allows a user to copy and paste the code to another site. Consequently, a separate field (not shown) or a link to a different site for replicating the widget need not be provided. However, in an alternate embodiment, the link to a different site may be provided and used. Moreover, a content provider may be allowed to customize the widget 180 at least to a limited extent. In one embodiment, this customization may be limited by the widget owner of the ancestor widget, as described below. Thus, replications or copies of a widget 180 may not be identical to the widget 180. For example, the code for the widget includes an identification of the event(s) with which the widget is associated and parameters related to the size, shape, and color of the widget. The copier of the widget 180 may be allowed change and/or add to the event(s) with which the widget is associated and alter the parameters to change the size, shape, and/or color of the widget displayed on the content provider's site. However, such changes may be limited or excluded by the owner of the ancestor widget.

Although copying may be performed through the field 190, in one embodiment, the original code for the widget 180 resides with the provider. Consequently, upgrades, changes to the widget configuration made by the widget owner, and other content may be pushed from the provider 101 to the widget 180. Such changes may also be pushed to some or all of the widget 180 copies. Embedded in the copied code may be a reference to the ancestor widget as well as a new identification to identify the copied widget. In addition to copying, an email may be requested so that the user copying the widget may request set up of an account identifying that user as the copier of that widget 180 and thus retaining any tracking, benefits, or rewards as a result of traffic generated from the copied widget.

In addition to being copied through the copying field 190, in some embodiments, the widget may be copied to other sites through the proxy server 106. In particular, the widget owner, the provider 101, or another content provider may wish to replicate the widget on other site(s) not directly associated with the provider 101. In order to do so, the proxy server 106 may provide an indirect connection to the other site(s), credential the site(s), and replicate the widget 180 to the site(s). Furthermore, the proxy server 106 may allow content, such as rich media audio or video, from site(s) not directly associated with the provider to be played on the widget 180. In addition, widgets may communicate directly through the proxy server, for example to disseminate comments, donation amounts, and/or other information.

Use of the system 100 and widget 180 may facilitate electronic transactions. Because the widget may be copied and further customized, sub-campaigns or other subsets of content of interest to copier(s) of an ancestor widget may be formed and tracked through the widget 180. For example, a content provider may copy a widget 180 to his or her own site. Thus, widgets such as the widget 122A on the site 120A may be provided from another widget 122 on another site 120. The widget owner of the copy (copy owner) may then be allowed to add a sub-campaign or other features to the copy. In a preferred embodiment, the copy owner registers with the ancestor widget owner (via the provider 101) in order to do so. For the purposes of discussion, the features that may be added or changed are described in the context of sub-campaigns. However, one of ordinary skill in the art will recognize that the modifications are not limited to sub-campaigns. The copy owner may be allowed to specify the terms of the sub-campaign within the context of the campaign, but generally would not be authorized to alter the specifications of the campaign. The sub-campaign might be considered to be a group payment from contributors to the sub-campaign. Such a sub-campaign may be tracked, including using tracking mechanisms, such as the tracking and payment subsystem 104, in a manner analogous to the campaign. For example, the widget owner of the ancestor widget may initiate a fundraising campaign for one million dollars and provide a campaign thermometer in the field 182 of the corresponding widget 180. A copy owner might initiate a sub-campaign for five hundred dollars. This sub-campaign would be provided in field 186 on a copy of the widget 180, further customized, and placed on the copy owner's or other site (e.g. their blog). The copy of the widget 180 corresponding to the sub-campaign may provide event progress tracking in the form of a sub-campaign thermometer in the field 186. The sub-campaign might include any contributions made through the copy owner's widget and copies of the copy owner's widget. A contributor may make a fifty dollar contribution to the sub-campaign. The provider 101 may then update both the campaign thermometer in field 182 and the sub-campaign thermometer in field 186. Although the fifty dollar contribution would not significantly alter the campaign thermometer, such a contribution may be visible on the sub-campaign thermometer in the copy owner's widget. Thus, further contributions are facilitated. Consequently, electronic financial transactions may be facilitated.

Data related to contributions through the widgets 122, 132, 142, 152, 122A, 122B, 122C, 132A, 132B, 132C, 132D, 132E, 142A, 142B, 142C, and 142D may also be tracked. As discussed above, in one embodiment payments, for example for electronic commerce or fundraising, may be made through any of the widgets 122, 132, 142, 152, 122A, 122B, 122C, 132A, 132B, 132C, 132D, 132E, 142A, 142B, 142C, and 142D. Various aspects of payments made and other features of the widgets 122, 132, 142, 152, 122A, 122B, 122C, 132A, 132B, 132C, 132D, 132E, 142A, 142B, 142C, and 142D may be tracked. For example, the number and amount of payments made through a widget and/or its copies, the number of visits to the widget and/or its copies, the time the widget and/or its copies have been available, the amount of time taken by the widget and/or its copies to receive donations, user comments, and other data related to the widget may also be tracked by the provider 101. This tracking might be performed by the tracking and payment subsystem 104 or another component (not shown). As a result, the provider 101 may determine an effectiveness for various sites 120, 130, 140, 150, 120A, 120B, 120C, 130A, 130B, 130C, 130D, 130E, 140A, 140B, 140C, and 102D and/or widgets 122, 132, 142, 152, 122A, 122B, 122C, 132A, 132B, 132C, 132D, 132E, 142A, 142B, 142C, and 142D. In one embodiment, an effectiveness percentage is determined based upon the number of views of a widget 122, 132, 142, 152, 122A, 122B, 122C, 132A, 132B, 132C, 132D, 132E, 142A, 142B, 142C, and/or 142D, the number of donors through the widget 122, 132, 142, 152, 122A, 122B, 122C, 132A, 132B, 132C, 132D, 132E, 142A, 142B, 142C, and/or 142D, the average contribution per donor, the aggregate donation through the widget 122, 132, 142, 152, 122A, 122B, 122C, 132A, 132B, 132C, 132D, 132E, 142A, 142B, 142C, and/or 142D, and analogous data for copies of the widget 122, 132, 142, 152, 122A, 122B, 122C, 132A, 132B, 132C, 132D, 132E, 142A, 142B, 142C, and/or 142D. Based on this effectiveness percentage, organizers may determine the content providers that are desired for particular campaigns.

Although the widgets 122, 132, 142, 152, 122A, 122B, 122C, 132A, 132B, 132C, 132D, 132E, 142A, 142B, 142C, and 142D may be copied, pushed to other sites, sub-campaigns or other subsets of interest formed, customized, these and other dissemination of the original widgets 122, 132, 142, and 152 may be moderated. Moderation allows the widget owner to control the sites with which their widget, event, and the widget owner themselves are associated. For example, the widget owner may authorize only specific sites and/or sites fitting a particular profile to host the widget 122, 132, 142, and/or 152. The provider 101 does not push the widget to sites not authorized by the organizer. If an unauthorized content provider or other unauthorized user copies the widget 122, 132, 142, and/or 152, then action may be taken based upon the widget owner's preferences. For example, when the unauthorized copier's site is accessed, the provider 101 may send a message to the widget owner requesting validation. In some embodiments, the widget may not be rendered until the widget owner has expressly approved for the site. Alternatively, the widget may be rendered unless and until the widget owner has expressly disapproved the site.

The widgets 180 may also reflect local data. The widget 122, 132, 142, 152, 122A, 122B, 122C, 132A, 132B, 132C, 132D, 132E, 142A, 142B, 142C, and/or 142D may be provided to multiple sites in a variety of ways, such as copies of widgets from the widget owner's site 120, copies of widgets 132 from provider's site 130, and copies of widgets from other content provider's (copier's) sites. In one embodiment, the widget 122, 132, 142, 152, 122A, 122B, 122C, 132A, 132B, 132C, 132D, 132E, 142A, 142B, 142C, and/or 142D may be configured to account for at least some of these local conditions. For example, the field 182 may display the donations using the local currency and indicate relevant times using the local time. In order to do so, the widget 180 may query the local computer system hosting the site to obtain local data, such as the time and/or language. The widget 180 may then convert various components to reflect the local data. For example, the language may be translated to the local language and/or the time of relevant occurrences such as the event ending may be updated to reflect the local time.

The widgets 180 may also be reusable. The widget 180 may be copied and/or pushed to sites. Once a widget 180 resides on a site, it may remain on the site unless and until expressly removed by the site owner or the provider 101. Furthermore, data may be pushed to widgets 122, 132, 142, 152, 122A, 122B, 122C, 132A, 132B, 132C, 132D, 132E, 142A, 142B, 142C, and 142D by the provider 101. A widget 180 may be generally associated with particular event(s) that have specific closing dates, such as a fundraising campaign, a wedding, a birthday, an ad campaign, or other event. Once the event closes or for some other reason the widget 180 is no longer associated with the event, the widget 180 may be available for reuse. The widget 180 may be reused by the provider 101 pushing data to the widget 180 and/or by the owner of the widget 180 re-customizing the widget 180 for new events. For example, when configuring the widget 180, a widget owner may indicate that once an event has closed, specific content is to be pushed to the associated widgets. This content could be a thank you message, an indication of other events that may be of interest to the content provider, or settings that reconfigure the widget 180 for another event. Similarly, a widget owner might reconfigure the widget 180 to be associated with another event or indicate to the provider 101 that the widget 180 may be reused for other events meeting certain criteria. In one embodiment, these types of reuse may be possible for both the ancestor widget and its copies. The provider 101 may push new settings and parameters to the widgets 122, 132, 142, 152, 122A, 122B, 122C, 132A, 132B, 132C, 132D, 132E, 142A, 142B, 142C, and 142D residing on other sites based on widget owners' specifications. A widget owner might specify that the widget 180 on its site is available for causes fitting particular profiles. For example, the owner of the widget 142D may specify that only certain ad campaigns or other data may be pushed to its widget. In one embodiment, these specifications must also fit within specifications provided by owners of the ancestor widgets 142 and 142A. The provider 101 may then push data to the widget 142D on the site 140D to reuse the widget 142D for events or other data fitting the profiles. The owner of the site 140D and/or widget 142D may be paid or otherwise rewarded for use and/or reuse of the widget 142D on the site 140.

The widget 180 may also "mature" and increase in value to both the widget owner and his/her audience. For example, assume that the widget 180 is a copy (e.g. widget 122A, 122B, or 122C) of another widget (e.g. 122), associated with a particular entity such as a business, and/or provides content from another entity. In such an embodiment, the system 100 may be used in affiliate marketing. The widget 180 may be used in affiliate marketing to dynamically display form, content, and functionality based on the cumulative actions taken by previous visitors during the life of the campaign, as well as on actions taken by the current visitor, and based on the rules, logic, and settings defined by the promoter, the organizer, and, optionally, the provider 101. Thus, for each action taken, the widget 180 may be dynamically modified if either the promoter (widget owner) or organizer (entity associated with the marketing campaign) set up a rule to modify the widget. For example, a visitor clicks through and makes a contribution to a non-profit. The widget 180 might be updated by a setting such as: adding the visitor's contribution amount to a campaign goal both visually in a graph and textually the number of contributors can be increased by one or posting the name or initials of the latest contributor on the widget. Such changes may be displayed in the field 182, 184, and/or 198. If a visitor contributes the final incremental amount needed to meet a campaign goal, the widget 180 might be updated to show a success image, to not accept any more click through for donations, to provide a special thank you message can appear, and/or have the widget's the look and feel changed. Other examples may be found in voter registration, mailing lists, or purchasing. A visitor may click through and complete a form such as an online voter registration form. In response, the widget 180 may be changed to show that one more person has taken the requested action. A visitor who clicks through and signs up for a mailing list may be the one thousandth person to do so from this widget 180. The widget 180 may be changed to now add a video/audio file that only shows up on widgets 180 that drive at least one thousand signups. A visitor clicks who through and makes a purchase may be the one hundredth purchaser through this widget 180. The widget 180 may now show a twenty percent discount message and content. Moreover, all future purchasers may receive the same discount. The types of actions, content changes, form changes, link changes, and element changes are not limited to the examples above. Rather the promoter and the organizer have free control over the rules to apply to actions taken by visitors. These rules, settings, and content may be configured and controlled via a Control Panel, such as the widget panel 112 discussed above.

Similarly, as the number of actions recorded from the widget 180 increases, the widget 180 may take on increased functionality and/or allow for a higher level of reward and/or recognition from the owner of the ancestor widget or other entity to which data on the widget corresponds. The audience for the widget 180 may share in the value by either having a better experience (due to the increased features/functions on the widget 180) or share in promotions/discounts passed on by the owner of the ancestor widget or other entity to which data on the widget corresponds. The increase in value (through functionality or other features) of the widget 180, as well as the event(s) and/or actions triggering an increase in maturity may be controlled all or in part by the owner of the ancestor widget or other entity to which data on the widget corresponds. These actions may also provide valuable data mining to the owner of the ancestor widget or other entity to which data on the widget corresponds. These entities may wish to track how social networks interact with content and actions. For example, in affiliate marketing applications, the method and system may provide significant advantages including but not limited to increased value to not only the organizer, but also the promoter and the promoter's audience.

Thus, using the system 100 and the widget 180, electronic transactions may be facilitated. Such transactions may include financial transactions and social transaction. Benefits may be provided to the widget owner, the owner(s) of copies of the widget and other providers, as well as users/viewers of the widget.

A natural application for the system 100 is in financial transactions. For example, the system 100 may be used in various events, such campaigns. A campaign may include a fundraising campaign, an advertising campaign, a sale of particular goods and/or services, or other commercial activities.

Figure 3:
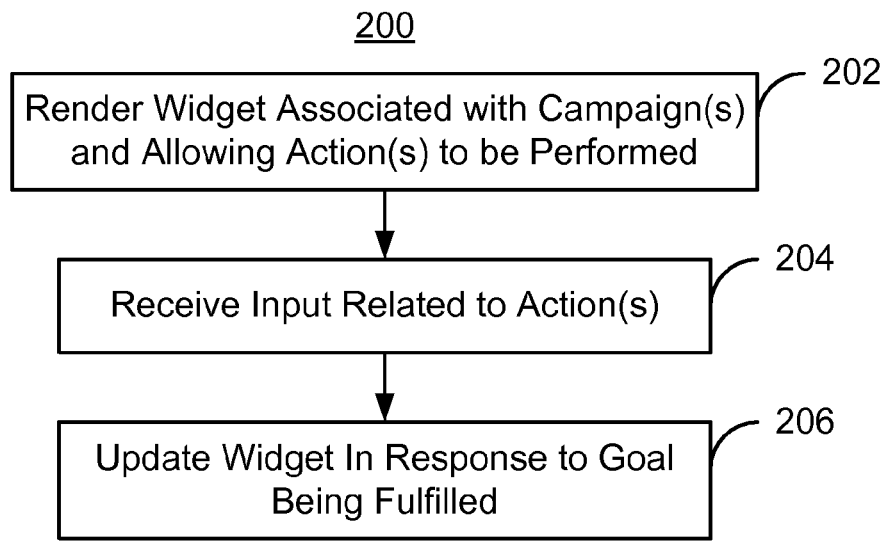
FIG. 3 depicts an exemplary embodiment of a method for providing a widget usable in marketing transactions.

FIG. 3 depicts an exemplary embodiment of a method 200 for providing a widget usable in transactions such as affiliate marketing. The widget dynamically displays multimedia content and may be used in performing the marketing transactions, particularly affiliate marketing. The widget may also be embeddable, portable and copyable. The method 200 allows a widget to be configured. For simplicity, the method 200 is described in the context of the widget 122A depicted in FIG. 1 as well as the widget 180 depicted in FIG. 2. However, the method 200 also applies to the remaining widgets 122, 122B, 122C, 132, 132A, 132B, 132C, 132D, 132E, 142, 142A, 142B, 142C, 142D, and 152. In addition, although steps of the method 200 are depicted as occurring in a particular order, one or more of the steps may be performed in another order, in parallel, or multiple times.

Referring to FIGS. 1-3 the widget 122A is rendered on a site, via step 202. The widget 122A rendered is based upon a configuration provided, for example to the widget maker 102. The configuration includes campaign(s) with which the widget 122A is associated. The widget 122A may thus dynamically display multimedia content associated with campaign(s) on the site 120A. The widget 122A is also embeddable and copyable. In one embodiment, the campaign(s) may be marketing campaign(s), such as affiliate marketing. In another embodiment, the campaign(s) may be related to the widgets themselves. For example a campaign may provide personal widgets, described below. Furthermore, the widget 122A allows user actions to be performed. As used herein, a user of the widget 122A is a viewer of the widget 122A. For example when visiting the site 120A, a user may view the content on the widget 1222A and may use the widget 122A to perform various tasks. The user actions performed may be varied. Examples of such user actions includes click throughs to other site(s) associated with the campaign(s), a contribution that may be to a charity associated with the campaign(s), other proof that a specific site was visited such as a token from the site or a confirmation from a payment page, making a copy of the widget 122A, or other actions of interest to the campaign(s). The campaign also includes goals associated with the widget 122A, such as a particular number of sales or a particular number of widget views.

In one embodiment, the widget 122A rendered in step 202 is owned by an entity other than the organizer of the campaign. For example, the widget 122 may be configured by the organizer and provided by the organizer on the organizer's site 120. However, the widget 122A rendered in step 202 might be a copy of the widget 122 and might reside on a different site 120A. The widget owner, or promoter, placing the widget 122A on the site 120A may be an independent entity wishing to monetize or otherwise be rewarded for providing the widget 122A. This widget 122A may, but need not, have been modified by its owner. If the campaign is an affiliate marketing campaign, at least some of the widgets rendered in step 202 are desired to be owned by other entities.

Input(s) related to the action(s) are received, via step 204. In one embodiment, the input(s) and action(s) are also related to the campaign(s). For example, the system 100 may register that a user has clicked on a button 188, 192, and/or 194, copied code such as the widget code in copying field 190, or made a payment through field 192. The click may take the user to another site on which the user may perform other tasks. The click through to the other site or the tasks performed there might also be considered input received in step 204. In such an embodiment, the input received may be from the site accessed through the widget 122A. For example the site could include embedded code for tracking the inputs received. In another embodiment, the input could include a request to copy the widget 122A and/or modifications to the copy. Such a task would indicate that the widget 122A is being disseminated, for example to the site 120B and/or 120C. Thus, the input received in step 204 indicates that the action(s) have been taken.

Based on the goal(s) corresponding to the action(s) taken, the widget 122A may be dynamically updated, via step 206. In particular, if the update may be provided in step 206 in response to the goal being fulfilled. For example, suppose a goal is to have a particular number of widget views. In such an embodiment, the update may be dynamically provided if the particular number of widget views is reached. Step 206 may thus be performed in response to the input received in step 206 being tracked, aggregated or otherwise processed and compared to goals for the widget 122A and/or campaign. In one embodiment, step 206 includes changing the configuration of the widget 122A stored in the database 108. The update performed in step 206 may change the configuration of the widget 122A in a variety of ways. In one embodiment, the look of the widget 122 may be changed by changing the color, changing the multimedia provided, altering the features, and/or providing additional feature(s). These rewards may, but need not, have a specific monetary value. The additional features might include additional multimedia content such as new video or audio, access to an additional uniform resource identifier (URI), a discount, a prize, a privilege, an additional function, payment to the widget owner, and/or recognition for the widget. The prizes and privileges may include guest passes to concerts or movies, tickets, access to content such as movies or their trailers prior to public release. These features may be provided to the owner of the widget 122A and/or users of the widget 122A. The update described herein may include rewards such as the above privileges and prizes in that the user and/or widget owner may be informed of the existence of the rewards through the update in the configuration.

Thus, using the method 200 the widget 122, 122A, 122B, 122C, 132, 132A, 132B, 132C, 132D, 132E, 142, 142A, 142B, 142C, 142D, and 152 may be provided, used to perform various actions, and dynamically updated. These updates may be used to reward the widget owner, the users, and/or the site owner for reaching particular goals. For example, a discount provided for a purchase through a widget 122A or additional content viewable via a particular widget 122A may reward both the widget owner and any user making a purchase or viewing the widget 122A. Consequently, the widget 122A may grow in popularity. As a result, the widget 122A may be further disseminated through copies and/or viewed on its site 120A. Because the widget 122A is associated with a campaign, information related to the campaign may reach a greater audience. Consequently, the method 200 may facilitate affiliate marketing. In addition, the method 200 may allow users to obtain customized user widgets that may be tradable and made more desirable due to the updates. The promoters/widget owners may also be able to monetize or otherwise capitalize on their site 120A through the widget 122A hosted on it. In addition, data related to and actions performed by the users and/or owners of the widgets in the method 200 may be tracked. Consequently, data mining may also be facilitated through the widgets of the method 200.

Figure 4:
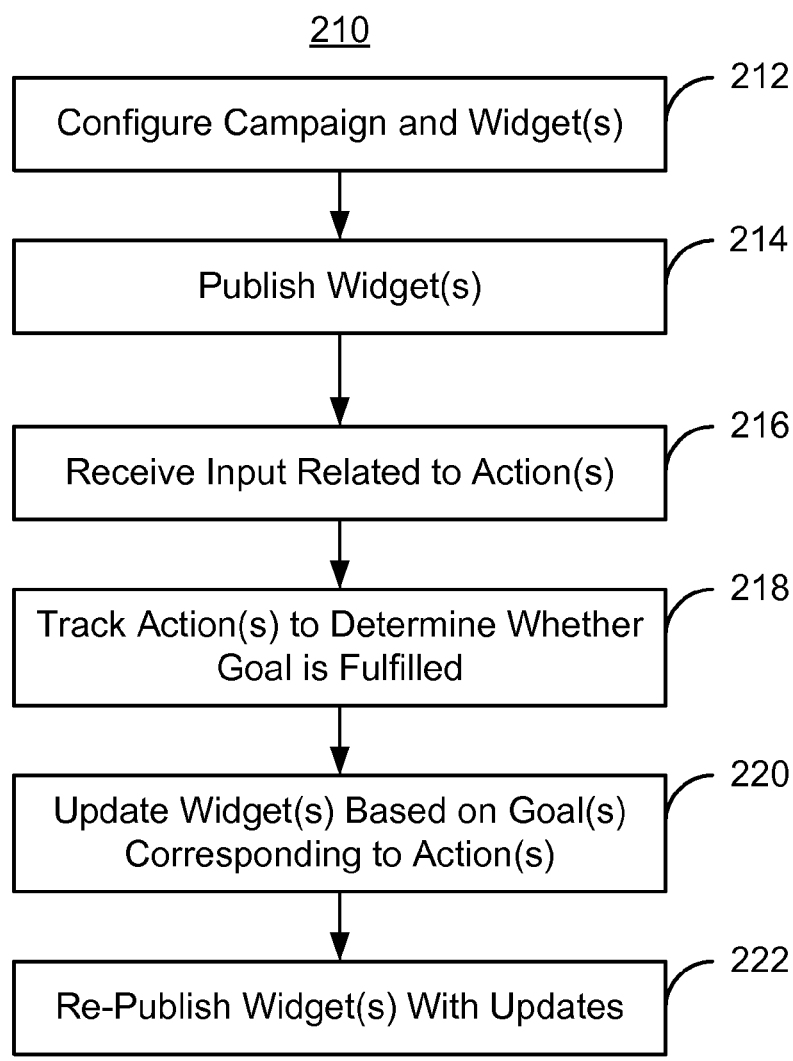
FIG. 4 depicts another exemplary embodiment of a method for providing a widget usable in marketing transactions.

FIG. 4 depicts another exemplary embodiment of a method 210 for providing a widget usable in transactions such as affiliate marketing. The widget dynamically displays multimedia content and may be used in performing the marketing transactions, particularly affiliate marketing. The widget may also be embeddable, portable and copyable. The method 210 allows a widget to be configured and disseminated. For simplicity, the method 200 is described in the context of the widget 122 depicted in FIG. 1 as well as the widget 180 depicted in FIG. 2. However, the method 210 also applies to the remaining widgets 122A, 122B, 122C, 132, 132A, 132B, 132C, 132D, 132E, 142, 142A, 142B, 142C, 142D, and 152. In addition, although steps of the method 210 are depicted as occurring in a particular order, one or more of the steps may be performed in another order, in parallel, or multiple times.

Referring to FIGS. 1-2 and 4, the organizer of the campaign configures the campaign and the widget 122 associated with the campaign, via step 212. To do so, the organizer may access portions of the provider 101. Step 212 may include setting features of the campaign such as the goods involved in a marketing campaign, target users, desired traits of users and/or promoters/widget owners, and desired widget owners/promoters, and goals for the actions. In addition, features of the widget 122 are configured. Thus, the fields 182, 184, 186, 188, 190, 192, 194, 196, and 198 that might be included, the widget color, multimedia provided, restrictions on modifications made to copies of the widget 122, desired user actions, tracking of the desired user actions, and other aspects of the widget 122 are configured. In addition, updates provided in response to goals being reached and the actions to which the goals correspond are also determined in step 212. For example, certain updates may be provided based on goals for specific user actions, such as a singly copying of the widget 122, while other updates may be provided in response to aggregate actions, such as a total number of times a particular widget is copied. Thus, the organizer configures the campaign and original widget 122. In the embodiment discussed, the organizer of the campaign and owner of the widget 122 are the same. However, in another embodiment, different entities may be associated with the campaign and the widget 122.

The widget 122 is published to the desired site(s) based on the configuration of the widget 122 and the selections made by the organizer, via step 214. Step 214 may be considered analogous to the step 202 of the method 200. In one embodiment, step 214 includes rendering the widget 122 on the site 120. Step 214 might also include pushing the widget 122 to additional sites, such as the site 120A. These additional sites may correspond to widget owners identified by the organizer as desirable for the campaign. In one embodiment, step 214 includes allowing the widget 122 to be copied, for example to the site 120A, 120B, and/or 120C. In such an embodiment, step 214 may also include allowing a copy 122A of the widget 122 to be copied. In such an embodiment, moderation may be performed as part of step 214 to ensure that copies of the widget 122 are only provided on desired sites and/or owned by desired promoters. Such modifications may include the widget owner/promoter configuring a sub-campaign. Examples of a sub-campaign may include a sub-campaign to obtain additional financial contributions or sign-ups for a service or other program. However, modification of the copies may also be restricted based upon the configuration determined in step 212. In one embodiment, rendering the widget in step 212 may be performed for each request to view the widget. Thus, rendering might include a host application such as a browser requesting a widget 122 when the site is viewed; the code and other data for the widget 122 being accessed for example from the database 108; the code for the widget 122 being returned to the host application and played; the widget 122 requesting its content, or widget feed; and the widget feed being provided to the widget 122, for example by the provider 101.

Input(s) related to the action(s) are received, via step 216. Stated differently, the widgets published in step 214 may be viewed and used to perform various tasks in step 216. Step 216 is thus analogous to step 204 of the method 200. User actions taken through the widget 122 are tracked and it is determined whether the goal(s) are fulfilled, via step 218.

Step 218 may include tracking individual user actions as well as aggregates of the user actions, as described above. Step 218 may also be performed in a variety of ways that use the input received in step 216. For example, the action may be set by providing the uniform resource identifier(s) (URI(s)) a visitor reaches when they have completed the specified action. In addition, step 216 may make use of embedded code in a desired site to receive an input from a user. Step 218 may use the input from the embedded code to determine the number of views of the site or proof that a particular user has accessed the site. In one embodiment, the organizer selects a type of code snippet (such as JavaScript, IMG tag, or other code) that will be used to track a specified action. The organizer may embed this code snippet into the sites to which the organizer is directing traffic and which the Organizer has sufficient control over to embed the code. Alternatively, the code snippet may be pushed to selected sites, for example by the provider 101. The code may be used with no modification or might be dynamic. For dynamic code snippets, the organizer embeds additional information about the action such as the purchase price or the name of a contributor to the code snippet in real time so that information specific to an action gets passed on to the provider for data compilation.

Step 216 may also use inputs provided by a particular widget 122A, for example a user clicking on a particular field or provide information to the field. Step 218 may then use this input to track the number of click throughs, a number of sign-ups for the campaign or other data of interest. It may also be determined if goals such as the click throughs, copies of a widget, or sign-ups reaching a particular number, are met. In one embodiment, user actions corresponding to copies of the widget 122 may also be tracked. In such an embodiment, the relationship between the copies and the ancestor widget(s) may be tracked and used, for example to determine how to categorize updates, calculate aggregates, and determine whether goal(s) are met.

Based on whether the goals are fulfilled for the action(s) taken, the widget(s) may be updated, via step 220. Step 220 is thus analogous to step 206 of the method 200. In one embodiment, step 220 includes determining whether the tracked actions have fulfilled some condition(s) corresponding to the goal(s). Thus, step 220 may be considered to employ conditional logic. For example, it may be determined whether the click throughs from a particular widget 122A have reached a threshold in step 220. If so, then an update such as additional content, discounts on purchases through the widget 122A, a payment directly to the owner of the widget 122A, or other response may be provided in step 220. If not, then tracking may simply continue.

Some or all of the widgets may be re-published, via step 222. In one embodiment, step 222 may include re-rendering all of the widgets corresponding to the widget 122. In another embodiment, only a portion of the widgets may be re-rendered. For example, only those widgets being updated might be re-published in step 222. Thus, updates such as rewards, privileges, payments to the promoter, and discounts may be made available in step 222.

Thus, using the method 210 the widget 122, 122A, 122B, 122C, 132, 132A, 132B, 132C, 132D, 132E, 142, 142A, 142B, 142C, 142D, and 152 may be provided, used to perform various actions, and updated in response to goals being reached. These updates may be used to reward the widget owner, the users, and/or the site owner. Consequently, the widgets associated with a campaign may grow in popularity. Effectiveness of the campaign may thus be improved. In addition, the method 200 may allow users to obtain customized user widgets that may be tradable and made more desirable due to the updates. Tracking of actions through such widget may also improve data mining. Such data may be useful to advertisers and other entities.

Figure 5:
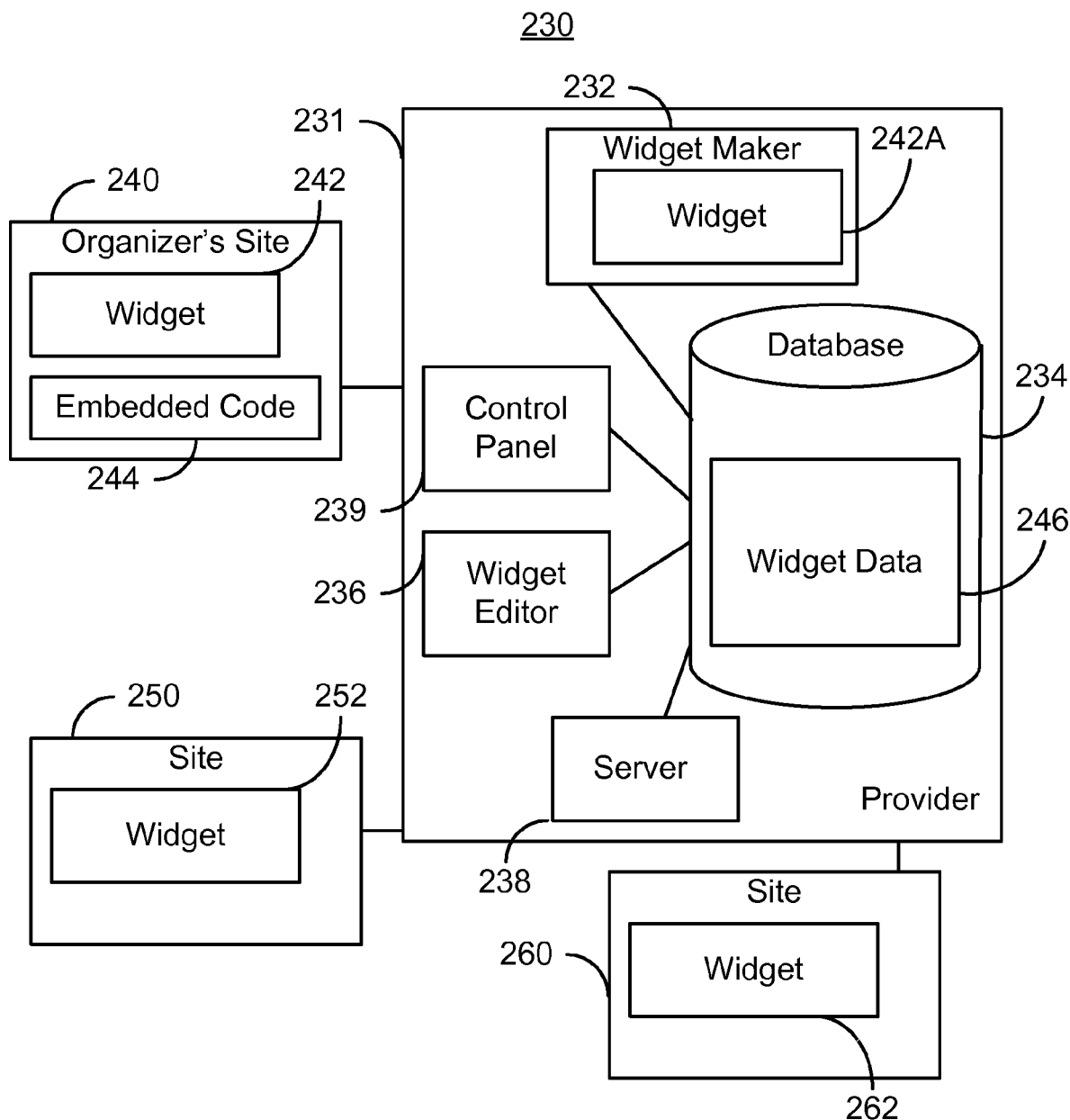
FIG. 5 depicts an exemplary embodiment of a system for providing a widget usable in marketing I transactions.

FIG. 5 depicts an exemplary embodiment of a system 230 for providing a widget usable in transactions, such as affiliate marketing. The system 230 is analogous to portions of the system 100. The system 230 thus includes a provider 231 analogous to the provider 101, a widget maker 232 that may be analogous to the widget maker 102, a database 234 analogous to the database 108, a widget editor 236 that may be analogous to a portion of the widget maker 102, a server 238 analogous to a portion of the provider 101, organizer interface 239 that may be provided by the server 238, and sites 240, 250, and 260. For clarity, only the sites 240, 250, and 260 and widgets 242, 252, and 262 are described. However, in another embodiment, additional sites and/or widgets may be used. Further, the sites 240, 250, and 260 may be considered to correspond to one or more of the sites 120, 130, 140, 150, 12A, 120B, 120C, 130A, 130B, 130C, 130D, 130E, 140, 140B, 140C, and 140D. Although shown separately, the widget maker 232 and widget editor 236 may be implemented using the server 238.

The organizer interface, or control panel, 239 may be used by the organizer to set various features of the campaign. In one embodiment, the organizer control panel 239 may be part of a widget panel (not shown) provided by the widget maker 232. In such an embodiment, configuration of the widget in connection with the campaign may be facilitated. Thus, the organizer may set the campaign parameters. For example, the organizer may set the campaign information, overall campaign goals, goals for the action(s) taken through the widgets, financial information, content, business rules, marketing rules, rich media files, payment information, links to external sources of campaign information, commission information, moderation rules (approved promoters who can post widget), and other data that would be needed for a dynamic campaign. In one embodiment, the organizer may change these parameters at anytime during a campaign. In such an embodiment, initial configuration and modification of the campaign may both be achieved through the control panel 239. Alternatively, modification of the campaign might be accomplished through a different mechanism (not shown). In one embodiment, the organizer might use the control panel 239 to create draft campaigns and at a later time move draft campaigns into live campaigns. As part of campaign configuration, the organizer might determine a date and/or set of conditions at which a campaign will end. In one embodiment, campaigns may also be ended early or suspended indefinitely or until a later date through the control panel 239. Campaigns may also be tied to end based on actions such as a finite number of sign ups, a specified dollar volume of actions, or other occurrences.

In addition to configuring the campaign, an organizer may also configure at least a portion of their site 240 using the control panel 239. For example, embedded code 244 used in tracking actions on the site 240 might be provided using the control panel. In one embodiment, other features of the site such as colors, video, audio, images and other content may be configured using the control panel 239. In another embodiment, other configuration of the site 240 might be provided using another mechanism (not shown).

The widget maker 232 might used by the organizer of the campaign to configure the widget 242. In addition, the updates provided in response to the goals, or conditions, being fulfilled may be provided through the widget maker 232 instead of the control panel 239. In the embodiment shown, the widget 242 is provided on the organizer's site 240. However, in an alternate embodiment, the widget 240 might not be provided on the site. Instead, the widget 240 would be made available in another manner such as pushing the widget 252 and 262 to desired sites 250 and 260, respectively. Because the widget 242 is initially generated using the widget maker 222, the widget 242A is shown on the widget maker 232. When configuring the widget 242, the organizer uses the widget maker 232 to make selections for the widget 242. For example, the widget owner may choose the color, actions of interest to the campaign, content presented, other selections that determine the look and feel of the widget 242, as well as the modifiability of copies of the widget 242. In one embodiment, the organizer may also determine the effect of the end of the campaign on the widget 242. For example, the organizer may indicate that the widget 242 and/or copies are disabled. Alternatively, the organizer might make the widget 242 and/or copies reusable. Thus, the widget maker 232 operates in an analogous manner to the widget maker 102.

The database 234 stores data 246 related to the widget 242. The database 234 may also store data (not shown) related to are copies of the widget 242 separately or with the data 246. The data 246 may include, among other information, the code corresponding to the widget 242, information related to the widget owner/organizer, information related to the campaign, and other information related to the widget 242. For example, the database 234 may store the actions to be tracked, how the actions are to be tracked, the goals for the action(s), and the updates provided in response to the actions. The database 234 may also store rules corresponding to conditional logic for determining whether the goals have been fulfilled and, therefore, whether the updates should be provided. Thus, the data 246 may include any rules, conditions, actions, and/or parameters to which the widget 242 is subject. In addition, the data 240 might be later modified using the widget maker 232 or the widget editor 236.

The widget editor 236 may be used to modify copies of the widget 242. In one embodiment, the widget editor 236 is separate from the widget maker 232. In such an embodiment, the widget editor 236 may perform a subset of the functions of the widget editor 232. In another embodiment, the widget editor 232 may be part of the widget maker 232. Although shown as corresponding to the provider 231, the widget editor 236 may be hosted by another entity (not shown). For example, a widget editor 236 hosted by another entity may be used to modify a copy of the widget 242 and post the copy to another site (not shown) associated with the entity.

The widget 242, 252, and 262 are provided on sites 240, 250, and 260, respectively, using the server 238. Thus, the code for the widgets 242, 252, and 262 is accessed from the database 234 and placed on the corresponding sites 240, 250, and 260, respectively. In order to provide the widgets 242/252/262 on the site 240/250/260, a widget player (not separately shown) that shares code in common with the widget maker 222 may be used. Such a widget player executes the embeddable code for the widget 242/252/262. Consequently, the widget player and widget 242/252/262 may be used synonymously herein. When published on the site 230/240/250, the widget 242/252/262 may access the data 246 and/or other data (not shown), for example through the server 238. In addition, the server 238 may be used to track data such relating to the widget 242/252/262. For example, progress of the campaign, updates to the widget 242/252/262, actions of viewers of the widget 242/252/262, other characteristics of the widget, aggregates of actions or other data, as well as other data may be tracked by the server 238. Such data may be stored on the database 234 and provided to the widget 242/252/262, for example in the form of a status bar or thermometer used as a tracking mechanism. In addition, the server 238 may determine whether the goals corresponding to the widget 242/252/262 have been fulfilled. In an alternate embodiment, the widget 242/252/262 may perform at least some of the tracking of actions and/or the determination of whether the corresponding goal(s) have been fulfilled.

In addition, to the mechanisms described above, the system 230 may provide tracking via technology such as cookies. In one embodiment, when a visitor clicks through a widget 252, the visitor may be directed to the server(s) 238. This click through may be an action which is tracked and might result in fulfillment of goal(s) and receipt of the attendant update(s). The server(s) 238 may set a cookie on the visitor's computer (not shown) that embeds both the promoter's identification and a campaign identification then redirects the visitor to the destination as set by the organizer. The visitor, now on the desired site, interacts with the site as he or she sees fit. When the action that the organizer wants tracked (for instance a contribution to a campaign) occurs, the embedded code, such as the code 244, that the organizer seeded onto a confirmation page makes a call back to the server(s) 238 to record the action, any desired data about the action, and information about the promoter, organizer, and visitor. In this embodiment, therefore, tracking may be performed using cookie technology.

The widgets 252 and 262 are copies of the widget 242. The discussion below presumes that the owner of the site 250/260 is the owner of the widget 252/262. However, common ownership is not required. The widgets 252 and 262 may have been copied by the owner of the site 250 and 260, respectively, or may have been pushed to the sites 250 and 260, respectively. The widgets 252 and 262 share at least some of the properties of the widget 242 configured by the organizer. In particular, at least some of the action(s) tracked, goals for the action(s) and updates provided by the organizer are common to the widgets 242, 252, and 262.

Using the system 230, the organizer may set conditional goals to track and reward with updates. The tracking may be based on actions such as widget views (number of times users view a particular widget 242/252/262), unique widget views (number of times different users view a particular widget 242/252/262), sites views, number of click throughs, or an aggregate of a number of specified actions taken. The conditional goals set by the organizer may be used to dynamically update the widget 242/252/262 as the goals are met. The widgets 242, 252, and/or 262 may be modified to look different, include different content, or offer promotions. Such updates may benefit both users and widget owners. The updates based on fulfillment of the goals might also benefit the widget owner. Such updates might include a reward of points, revenue sharing, and recognition on a list of top widgets.

The updates may also be based on a point system. The organizer may set up a points system based on performance of each specific widget 242/252/262 in their campaign. As part of configuring the campaign using the control panel 239 and/or the widget 242 using the widget maker 232, the organizer may determine how points are accumulated and at what interval. For example, points may be awarded based on a number of widget views or the number of actions taken by user/visitor within a specified amount of time. Stated differently, tracking of the actions may be performed through the points provided for specific actions. These points may be awarded to the widget owner to be redeemed for organizer prizes and privileges (tickets, guest passes, and additional content). As part of the point system, the organizer may also set promotion levels for rewarding points for referral signups.

If a visitor signs up for an organizer widget 242 through a promoter's widget 252, then both the existing promoter 252 and new promoter (not shown) may receive bonus points. The organizer may also set up different widget types based on goals achieved as measured by points. The system 230 may thus serve up the different widget types based on the accumulated value gained by each promoter's widget 252/262. For example a movie fan widget may obtain enough points to be updated to include a tab showing new movie trailers 24 hours before they are released to the public. The widget having the tab may be considered to be a new type of the widget. Thus, the system 200 may provide rewards to both users and promoters.

In order to improve the ability of the system 200 to function, the campaign configured using the control panel 239 may also be promoted to more than just potential viewers. In particular, the provider 101 and the organizer may promote this campaign to potential promoters. In one embodiment, potential promoters, such as the owners of widgets 252/262 and/or sites 250/260, may be directed to the provider's or promoter's site, live Widgets for the campaign hosted by promoters, through pages set up by the organizer, and/or through other mechanisms. Based on moderation rules set up by through provider 131, promoters may be allowed to request permission to take part in the campaign. For example, promoters may desire to become widget owners and request to copy the widget 242 and host the copy 252/262 on their site 250/260. If the campaign is moderated, the promoter may be required to wait for approval from the moderating authority (ies). One embodiment of providing moderation of the widgets is discussed above. The moderating authority(ies) may include the provider 231, the organizer, and/or a third party. As part of moderation, the provider 231 or the organizer may request that specific information such as destination URI, information about the promoter, statistics about the promoter's destination URI, or other pertinent information be provided as part of the request to take part in a campaign.

Once approved, the promoter/owner of widget 242/252 may be allowed to modify their widget 242/252 through the widget editor 236. For example, a promoter may set up a sub-campaign through their account with the provider, through the control panel 239 or the widget editor 236. The promoter may set up specific parameters related to their sub-campaign. However, any such modifications to the copies 252/262 might require approval of the organizer/owner of widget 242. For example, an organizer may allow a promoter to use a custom title, end date, target amount to raise, and number of target widget page views. An organizer may also allow a promoter to modify the size, content, colors, graphics, rich media, functionality, features, and other aspects of the widget 252/262. For example, a promoter may be allowed to use a custom image backdrop on a widget 252/262. As a result, the widgets 252/262 may promote the same campaign, but have their own look and feel.

In one embodiment, when a user views a widget 252/262, the widget 252/262 makes a call to the server(s) 238 to obtain the latest widget feed. In one embodiment, each widget 242/252/262 pulls data from a unique widget feed customized for the campaign and/or sub-campaign configured by the organizer and/or widget owner. Based on the contents of the widget feed and the parameters set by the provider 231, the promoter, and the organizer, the widget 252/262 is displayed accordingly. A widget 242/252/262 may also check for an update to the data feed after a certain interval, for example every few seconds. If a visitor is viewing a widget 242/252/262 and the widget 242/252/262 receives a changed widget feed (e.g. an update) based on an action, the widget 242/252/262 may be re-rendered based on the new information. For example, suppose a donation from another visitor went through the widget 242 and was confirmed. The campaign raised amount could be increased by the amount of that donation. For every view of the widget 252, a call may be made by the widget 252 to the server 238 to log that page view and all relevant data about that page view. Such data may include client IP address, campaign ID, Promoter ID, date, time, URI, and other information. The widget 252 may be displayed to each view including the new campaign amount. Similar procedures may be followed for other updates to the widget based upon fulfillment of goals. A widget 252 may also show a particular state of the campaign such as suspended, active, or end of campaign with each state showing customizable messages.

As discussed above, the system 230 may use various mechanisms to track actions and determine whether the organizer's goal(s) have been met. Once the action and data are logged, the server(s) 238 update the database 234 which control the widget feed sent to the widget 242/252/262. The specific widget feed for a sub-campaign is updated and all subsequent widget calls to the provider 231 to get the latest widget feed are subsequently be re-rendered based on the updated data logged as a result of the visitor's action(s).

In the system 230, each widget 242/252/262 may also gain "value" as measured with respect to the goals set by the organizer. For example, a widget 252 corresponding to actions that have fulfilled more goals or are closer to fulfilling more goals may have a higher value than a widget 262 that corresponding to actions that has fulfilled fewer goals. In one embodiment, this value can be passed on to the audience when the widget is dynamically updated. For example, enhanced features on the widget may include new video, audio, sneak previews of movie trailers or additional value offered for an action taken by the visitor not available to all campaign widgets. Promoters may also gain points as described above.

The system 230 may also be used in the data mining described above. A detailed report of action(s) taken and other occurrences related to the campaign may be available to organizers. Similarly, while a subset of that report may be made available to the promoter/widget owner(s) associated with sub-campaigns. Information included in the report may include information per widget 242/252/262, as well as other information such as promoter, audience, or other information. Information per widget 242/252/262 may include items such as a number of widgets posted, locations of widgets posted for example by IP or reverse IP lookup, number of widget views by individual widgets, number of determined action taken, number of click through, number of new signups from widget, number of tab views of individual tabs within the widget. Such data may be valuable to organizers or other entities for use in marketing or other activities.

A subset of this system 230 used in affiliate marketing might also be used to allow individuals to create customized personal widgets. As widget owners, the individuals may be allowed to perform the functions described herein for widget owners. In such an application, an individual may create an account on the system 230 and configures a corresponding widget, such as the widget 252. The account may include identification information for the widget owner, such as name and email address, as well as for the widget. Such information may be provided through the control panel 239 or widget maker 232 and stored in the database 234. Alternatively, the widget owner might sign up from an existing widget, such as the widget 242, that allows direct sign ups, or by clicking through from another widget. During customization using the widget maker 232, the individual may select features of their widget 252 in a manner analogous to that which an organizer uses. An individual might give permission for other users to selectively modify parts of copies of their widget 252 or the widget 252 itself. For example, this may be accomplished by other individuals (not shown) logging in directly on the widget 252 and having access to modify certain parts or tabs. As part of the configuration process, an individual might select whether their widget 252 is listed on a public widget directly on the provider 231 or system(s). An individual may also create a customized personal widget by selecting from an assortment of options: size, color, decorations, content, forms, tabs, features, or other characteristics of the widget that may be provided by the widget maker 232.

Various applications of the system 230 may also be combined. For example, the personal widgets described above and the point system might be combined. In one such embodiment, if an individual signs up directly on a site (not shown) hosted by the provider 231, the individual may given a certain number of points as determined by the system 230. These points may be redeemed for add-ons for the personal widget such as decorations, additional tabs, features such as audio/video, custom content. However, the customization of this new widget 242/252/262 may be limited by the number of points a new user is given. If an individual is referred to create an account by an existing personal widget 242/252/262, both the new user and existing user may receive a promotional bonus of points to be redeemed for widget customizations. An individual may also select to have their widget sponsored by one of the provider's partner(s) so as to receive additional points for customization. By being a sponsored widget 242/252/262 the individual may be limited in/constrained against making certain customizations to the widget and also agree to share their widget information with the partner.

An individual user may able be able to modify/edit and otherwise control such a widget 242/252/262 in multiple ways. For example, an individual may login in to the system 230 and use the widget editor 236. The user may also be allowed to modify their widget 242/252/262, for example via forms embedded directly in the widget that connect back to the provider's server(s). The user may also be able to modify their widget 242/252/262 via mobile devices, SMS codes, MMS codes, telephony, and/or other devices. In addition, modification through other methods that can pass information to the widget provider's system, including email, may also be allowed. An individual user may also be allowed to set up moderation levels for their widget 242/252/262. For example, an individual user may select no moderation, allowing anyone to copy and paste the widget anywhere, or some level of moderation between. The widget owner might select pre-approved moderation to allow certain friends as defined, for example, by address book preferences (e.g. email addresses) provided to the system 231, having an account on the provider 231, standing/rating on the provider 231, and/or predetermined domains (where the widget will be placed). The user may also select individual moderation in which an individual moderates each request to copy their individual widget 242/252/262 and approve/disapproves/holds each copied widget 242/252/262. Promotion of individual custom widget may also be allowed. In one embodiment, the audience for a site 250 may copy or request to copy widget code directly from widget 242/252/262. The audience may thus select a widget 242/252/262 from a marketplace of available widgets. Individual users may also be able to provide email invites for others to copy/embed their personal widget 242/252/262.

Additional functionality may also be provided. These functions may include but are not limited to the functions described below. In addition, these functions may be considered to correspond to functions described above. In a preferred embodiment, widget tracking for individuals' personal widgets 242/252/262. An individual may place tracking code for their widget 242/252/262 either on their site 240/250/260 or by posting their "parent" widget on the page to which they want to track click throughs. For example an individual user may place tracking code or a tracking widget 242/252/262 on their MySpace page so that users who click on their widget end up at their MySpace page. Audience members may "ping" an individual via the widget 242/252/262, that is send them a quick message or just touch them by clicking on a widget 242/252/262. In this way an individual can know a widget owner contacts.

Widget points and value may also be accrued in a manner described above. An individual (e.g. their widget 242/252/262) gains points in the system 230 as a calculation of certain actions such as: widget views (such as page views), number of widgets posted, activity on editing/modifying widget, number of new users signed up through widget, and other mechanisms to be determined. Individuals may redeem their widget points for additional features functions on their personal widget 242/252/262 (such as decorations, additional tabs to place features on, and/or exclusive content). Individuals may also redeem their widget points for goods/services as determined by the marketplace interacting with the personal widget(s) 242/252/262. Points may also be given as promotions to get new users to sign up. If a new individual user signs up for this personal widget service by clicking on an existing widget 242/252/262, both the original individual user and new individual user may be awarded points. These personal widgets 242/252/262 may also be used tracking and reporting. Individual users may have access to a report of their widget 242/252/262 individually and as an aggregate: such as a number of widget views, number of tab views (tabs within the widget), number of signups, number of widgets posted, other authorized users logging in and their edits.

Thus, the system 230 may be applied to provide widgets 242/252/262 usable in affiliate marketing and personal widgets. The widgets 242/252/262 may receive dynamic updates based upon goals fulfilled. These updates may be used to reward the widget owner, the users, and/or the site owner. Consequently, the widgets associated with a campaign may grow in popularity. Effectiveness of the campaign may thus be improved. In addition, the method 200 may allow users to obtain customized user widgets that may be tradable and made more desirable due to the updates. Tracking of actions through such widget may also improve data mining. Such data may be useful to advertisers and other entities.

Figure 6:
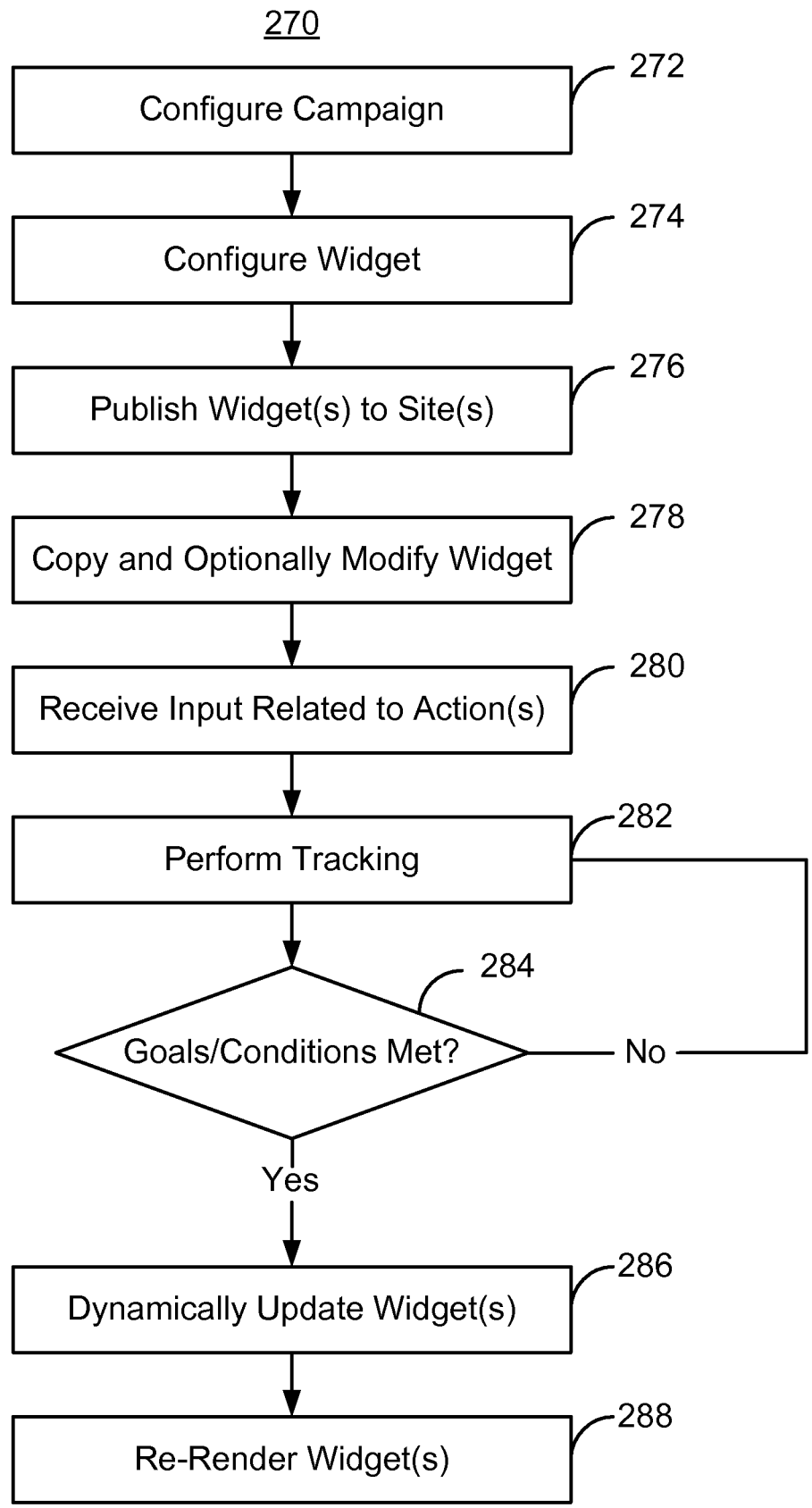
FIG. 6 depicts another exemplary embodiment of a method for providing widget usable in marketing transactions.

FIG. 6 depicts another exemplary embodiment of a method 270 for providing widget usable in marketing transactions. The method 270 is described in the context of the system 230. However, the method 270 may be used in another system (not shown) having different and/or additional components. For example, the method 270 may be used in connection with the system 100. In addition, although steps of the method 270 are depicted as occurring in a particular order, one or more of the steps may be performed in another order, in parallel, or multiple times.

Referring to FIGS. 5-6, the organizer configures the campaign and site 240 which the organizer desires users to access, via step 272. Step 272 may include using the control panel 239 to set goals and other parameters for the campaign, provide embedded code 244 to the site(s), determine the goals and updates in response to reaching the goal(s), and determine other parameters for the campaign. The widget 242 is also configured, via step 274. In one embodiment, step 242 includes accessing the widget maker 222 for the new widget 242. For example, the organizer might indicate the goals and updates to the widget 242 in response to reaching the goals, data source, colors, and other aspects of the widget 242 and system 230. Thus, steps 272 and 274 are analogous to step 212 of the method 210 depicted in FIG. 4.

Referring back to FIG. 6, the widget 242 is published to the desired site(s) set in the configuration set by the organizer in steps 272 and 274, via step 276. Step 276 may be considered analogous to the steps 202 and 214 of the methods 200 and 210, respectively. In one embodiment, the widget 242 may be published only to the organizer's site 240. However, in another embodiment, the widget 242 may be pushed to other sites, such as the sites 250 and 260. Thus, widget 252, and 262 might also be provided.

The widget 242 may be copied and optionally modified, via step 278. In one embodiment, the widgets that were pushed to other promoters' sites in step 276 may also be modified in step 278. In one embodiment, moderation may be performed as part of step 278 to ensure that copies of the widget 122 are only provided on desired sites and/or owned by desired promoters. Such modifications may include the widget owner/promoter configuring a sub-campaign. However, modification of the copies may also be restricted based upon the configuration determined in steps 272 and 274. In one embodiment, publishing the widget in step 276 may include rendering the widget on a host application each time a viewer accesses the site(s) on which the widget resides.

Input(s) related to the action(s) are received, via step 280. Tracking is also performed, via step 282. Thus, the actions of interest may be tracked using the server 238, embeddable code 244, widgets 242/252/262, and other mechanisms available. In addition, the aggregates for actions, such as the total number of widget views, may also be determined and tracked as part of step 282.

Based on the actions taken and tracking performed in steps 280 and 282, respectively, it is determined whether any of the goals for which updates are provided, via step 284. If not, tracking is continued to be performed without goal-based updates being provided to the widget 242/252/262. If one or more goals have been met, then the widget 242/252/262 is dynamically updated, via step 286. Some or all of the widgets may be re-published, via step 288. Thus, the appropriate rewards may be provided to the users and/or owner of the widgets 242, 252, and/or 262.

Thus, using the methods 200, 210 and 270 and/or the system 100 and 230, campaigns may be configured and the widgets corresponding to the campaign may be provided and disseminated. The widgets may used to perform various actions. These actions may be tracked against campaign goals. Further, the widgets may be updated in response to goals being reached and republished. These updates may be used to reward the widget owner, the users, and/or the site owner. The widgets may grow in popularity and use. Thus, the organizer of the campaign is better able to disseminate their information. The widget owners/promoters and users may also be rewarded. For example, widget owners may share in revenues and both widget owners and users may capitalize on the increased functionality or other improvements to the widget. In addition, the methods 200, 210, and 270 and systems 100 and 200 may allow users to obtain customized user widgets that may be tradable and made more desirable due to the updates. Tracking of actions through such widget may also improve data mining. Such data may be useful to advertisers and other entities.

A method and system for providing and using a widget in transactions such as affiliate has been disclosed. The present invention has been described in accordance with the embodiments shown, and one of ordinary skill in the art will readily recognize that there could be variations to the embodiments, and any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

We claim:

1. A computer implemented method for providing a widget comprising:
   rendering the widget on a site, the widget for dynamically displaying multimedia content associated with a campaign, the widget being embeddable, copyable, and allowing at least one user action;
   receiving at least one input related to the at least one action;
   updating the widget based on at least one goal corresponding to the at least one action;
   tracking the at least one action, the tracking further including determining an aggregate for the at least one action; and wherein the widget updating further includes
   updating the widget based on a goal for the aggregate.

2. The method of claim 1 wherein the campaign is associated with an organizer and wherein the widget and the site are associated with an owner different from the organizer.

3. The method of claim 1 wherein the tracking further includes:
   providing a point for a portion of the at least one action; and
   tracking a number of points for the widget.

4. The method of claim 1 wherein the at least one action includes at least one of a view of the widget, a click through to a site associated with the campaign, a contribution, proof that a specific site was visited, copying of the widget, and a sign-up.

5. The method of claim 1 further comprising:
   rendering the widget after the updating step.

6. The method of claim 1 wherein the updating further includes:
   providing an additional feature for the widget.

7. The method of claim 6 wherein the additional feature includes at least one of additional multimedia content, access to an additional uniform resource identifier, a discount, a prize, a privilege, an additional function, recognition for the widget.

8. The method of claim 1 wherein a widget owner is associated with the widget and wherein the at least one action includes a purchase, the method further comprising:
   providing a payment to the widget owner based on the purchase.

9. The method of claim 1 wherein the widget is a copy of an ancestor widget and wherein the method further includes:
   receiving a configuration for a sub-campaign associated with the campaign, the sub-campaign being configured by a widget owner associated with the site.

10. The method of claim 1 wherein the widget has a plurality of copies, the method further comprising:
    providing the update to at least a portion of the plurality of copies.

11. A computer implemented method for providing a widget associated with a widget owner, the method comprising:

rendering the widget on a site associated with the widget owner, the widget for dynamically displaying multimedia content associated with a campaign for an organizer, the widget being embeddable, copyable, and allowing at least one user action;

receiving at least one input related to the at least one action;

tracking the input related to the at least one action, wherein the tracking further includes determining an aggregate for the at least one action;

providing a payment to the widget owner based on at least one goal associated with the at least one action; and updating the widget based on the at least one goal corresponding to the aggregate.

12. A system for providing a widget comprising;

a widget maker for receiving a configuration of the widget, the widget for dynamically displaying multimedia content, the widget being embeddable, copyable, and allowing at least one user action, the configuration including a campaign with which the widget is associated, the configuration further indicating an update for the widget based on a goal corresponding to the at least one action;

a database for storing data for the widget;

at least one server for rendering the widget on a site, the at least one server further tracking the at least one action, and determining an aggregate for the at least one action; and wherein the update is based on a goal for the aggregate.

13. The system of claim 12 further comprising:

a control panel for configuring the campaign.

14. The system of claim 12 wherein the campaign is associated with an organizer and wherein the widget and the site are associated with an owner different from the organizer.

15. The system of claim 12 wherein the at least one action includes at least one of a view of the widget, a click through to a site associated with the campaign, a contribution, proof that a specific site was visited, copying of the widget, and a sign-up.

16. The system of claim 12 further comprising:

an additional site, the at least one action being related to the additional site, the additional site including embeddable code for tracking the at least one action.

17. The system of claim 12 wherein the widget is a copy of an ancestor widget and wherein the configuration further includes a sub-campaign associated with the campaign.

* * * * *